(12) United States Patent
Mehin et al.

(10) Patent No.: US 9,559,869 B2
(45) Date of Patent: Jan. 31, 2017

(54) VIDEO CALL HANDLING

(75) Inventors: Afshin Frederick Mehin, San Francisco, CA (US); Valentina Venza, Venice (IT); Suzanne Gibbs Howard, San Francisco, CA (US); Astrid van der Flier, San Francisco, CA (US); Elger Oberwelz, San Francisco, CA (US); Nicholas Zambetti, San Francisco, CA (US); Jesse Tane, San Francisco, CA (US); Katrin B. Gosling, Woodside, CA (US); Coe Leta Rayne Stafford, Millbrae, CA (US); Martin Nicholas John Heaton, San Francisco, CA (US); Matthew Robert Adams, Mountain View, CA (US); Peter Riering-Czekalla, Oakland, CA (US); Andrew Paul Switky, Menlo Park, CA (US); Michael Gibson, Evergreen, CO (US); Richard Cerami, Denver, CO (US)

(73) Assignee: Qwest Communications International Inc., Denver, CO (US)

( * ) Notice: Subject to any disclaimer, the term of this patent is extended or adjusted under 35 U.S.C. 154(b) by 697 days.

(21) Appl. No.: 12/981,987

(22) Filed: Dec. 30, 2010

(65) Prior Publication Data
US 2011/0273526 A1 Nov. 10, 2011

Related U.S. Application Data

(60) Provisional application No. 61/331,337, filed on May 4, 2010.

(51) Int. Cl.
*H04L 12/66* (2006.01)
*H04N 7/14* (2006.01)
(Continued)

(52) U.S. Cl.
CPC .......... *H04L 12/66* (2013.01); *H04L 65/1006* (2013.01); *H04L 65/1069* (2013.01);
(Continued)

(58) Field of Classification Search
USPC ................................ 370/389; 725/78, 80, 81
See application file for complete search history.

(56) References Cited

U.S. PATENT DOCUMENTS 5,444,477 A * 8/1995 Yamadera ............... H04M 3/58
348/14.01
5,577,915 A 11/1996 Feldman
(Continued)

FOREIGN PATENT DOCUMENTS

EP 1659794 5/2006
EP 1659794 A1 * 5/2006
(Continued)

OTHER PUBLICATIONS

U.S. Appl. No. 12/981,998; NonFinal Office Action dated Dec. 3, 2012; 29 pages.
(Continued)

*Primary Examiner* — Duc Nguyen
*Assistant Examiner* — Yogeshkumar Patel
(74) *Attorney, Agent, or Firm* — Swanson & Bratschun, L.L.C.

(57) ABSTRACT

Solutions for facilitating enhanced video calling functionality. Embodiments include functionality for handling video calling through a communications hub. According to some embodiments, the communications hub is a user supersystem having multiple clients, each with an integrated camera and display, capable of seamlessly handing off video call functionality among the clients. Other embodiments inte-
(Continued)

grate other functionality of the communications hub (e.g., web browsing, multimedia, etc.) into the video call environment.

23 Claims, 17 Drawing Sheets

(51) Int. Cl.
  *H04N 21/436* (2011.01)
  *H04N 21/4788* (2011.01)
  *H04L 29/06* (2006.01)

(52) U.S. Cl.
  CPC ....... *H04N 7/147* (2013.01); *H04N 21/43615* (2013.01); *H04N 21/4788* (2013.01)

(56) References Cited

U.S. PATENT DOCUMENTS

| | | |
|---|---|---|
| 5,862,322 A | 1/1999 | Anglin et al. |
| 5,946,669 A | 8/1999 | Polk |
| 6,052,442 A | 4/2000 | Cooper et al. |
| 6,119,107 A | 9/2000 | Polk |
| 6,434,604 B1 | 8/2002 | Harada et al. |
| 6,473,631 B1 | 10/2002 | Siddoway et al. |
| 6,834,195 B2 | 12/2004 | Brandenberg et al. |
| 6,968,362 B2 | 11/2005 | Koch et al. |
| 6,970,696 B1 | 11/2005 | Fuoss et al. |
| 6,993,596 B2 | 1/2006 | Hinton et al. |
| 7,120,241 B1 | 10/2006 | Fuoss et al. |
| 7,159,178 B2 | 1/2007 | Vogt et al. |
| 7,185,054 B1 | 2/2007 | Ludwig et al. |
| 7,302,436 B2 | 11/2007 | Qubti et al. |
| 7,343,561 B1 | 3/2008 | Stochosky et al. |
| 7,451,389 B2 | 11/2008 | Huynh et al. |
| 7,593,992 B2 | 9/2009 | Wodtke et al. |
| 7,669,134 B1 | 2/2010 | Christie et al. |
| 7,673,327 B1 | 3/2010 | Polis et al. |
| 7,721,224 B2 | 5/2010 | Sellen et al. |
| 7,777,783 B1 | 8/2010 | Chin et al. |
| 7,881,957 B1 | 2/2011 | Cohen et al. |
| 7,882,433 B2 | 2/2011 | Callaway et al. |
| 7,933,952 B2 | 4/2011 | Parker et al. |
| 7,945,469 B2 | 5/2011 | Cohen et al. |
| 7,957,326 B1 | 6/2011 | Christie, IV |
| 7,970,649 B2 | 6/2011 | Wu |
| 8,019,875 B1 | 9/2011 | Nielsen |
| 8,027,861 B2 | 9/2011 | Brintle |
| 8,037,021 B2 | 10/2011 | Adler et al. |
| 8,037,041 B2 | 10/2011 | Gupta |
| 8,037,070 B2 | 10/2011 | Maghoul |
| 8,082,308 B1 | 12/2011 | Filev |
| 8,185,897 B2 | 5/2012 | Kushwaha |
| 8,219,920 B2 | 7/2012 | Langoulant et al. |
| 8,255,258 B1 | 8/2012 | Cohen et al. |
| 8,271,591 B2 | 9/2012 | Malik et al. |
| 8,285,195 B2 | 10/2012 | Etuk et al. |
| 8,289,158 B2 | 10/2012 | Bocking et al. |
| 8,302,015 B2 | 10/2012 | Krishnan et al. |
| 8,306,507 B2 | 11/2012 | Kim et al. |
| 8,321,704 B2 | 11/2012 | Clarke et al. |
| 8,330,773 B2 | 12/2012 | Nielsen et al. |
| 8,335,989 B2 | 12/2012 | Barraclough et al. |
| 8,360,858 B2 | 1/2013 | LaRocca et al. |
| 8,516,062 B2 | 8/2013 | Killoran et al. |
| 8,532,630 B2 * | 9/2013 | Mottes .................... 455/414.1 |
| 8,549,520 B2 | 10/2013 | Stoitsev et al. |
| 8,566,145 B2 | 10/2013 | Dollens |
| 8,819,566 B2 | 8/2014 | Mehin et al. |
| 8,942,367 B1 | 1/2015 | Croak et al. |
| 9,356,790 B2 | 5/2016 | Zambetti et al. |
| 9,501,802 B2 | 11/2016 | Van der Flier et al. |
| 2001/0001083 A1 | 5/2001 | Helot |
| 2001/0047290 A1 | 11/2001 | Petras et al. |
| 2002/0007309 A1 | 1/2002 | Reynar |
| 2002/0016734 A1 | 2/2002 | McGill et al. |
| 2002/0029304 A1 | 3/2002 | Reynar et al. |
| 2002/0035581 A1 | 3/2002 | Reynar et al. |
| 2002/0059376 A1 | 5/2002 | Schwartz |
| 2002/0080180 A1 | 6/2002 | Mander et al. |
| 2002/0087591 A1 | 7/2002 | Reynar et al. |
| 2002/0099654 A1 | 7/2002 | Nair |
| 2002/0111824 A1 | 8/2002 | Grainger |
| 2002/0116363 A1 | 8/2002 | Grainger |
| 2002/0120932 A1 | 8/2002 | Schwalb |
| 2002/0123936 A1 | 9/2002 | Hansen et al. |
| 2002/0143564 A1 | 10/2002 | Webb et al. |
| 2002/0147717 A1 | 10/2002 | Barros et al. |
| 2002/0160806 A1 | 10/2002 | Arazi et al. |
| 2002/0161733 A1 | 10/2002 | Grainger |
| 2003/0059024 A1 | 3/2003 | Meyerson et al. |
| 2003/0113100 A1 | 6/2003 | Hecht et al. |
| 2003/0120711 A1 | 6/2003 | Katz |
| 2003/0129569 A1 | 7/2003 | Callaway et al. |
| 2003/0163525 A1 | 8/2003 | Hendriks et al. |
| 2003/0195976 A1 | 10/2003 | Shiigi |
| 2003/0220972 A1 | 11/2003 | Montet et al. |
| 2004/0010464 A1 | 1/2004 | Boaz |
| 2004/0078776 A1 | 4/2004 | Moon et al. |
| 2004/0119814 A1 | 6/2004 | Clisham et al. |
| 2004/0133440 A1 | 7/2004 | Carolan et al. |
| 2004/0172279 A1 | 9/2004 | Carolan et al. |
| 2004/0228531 A1 | 11/2004 | Fernandez et al. |
| 2004/0230599 A1 | 11/2004 | Moore et al. |
| 2005/0026649 A1 | 2/2005 | Zicker et al. |
| 2005/0032527 A1 | 2/2005 | Sheha et al. |
| 2005/0076049 A1 | 4/2005 | Qubti et al. |
| 2005/0096034 A1 | 5/2005 | Petermann |
| 2005/0108091 A1 | 5/2005 | Sotak et al. |
| 2005/0130631 A1 | 6/2005 | Maguire et al. |
| 2005/0197999 A1 | 9/2005 | Kumar |
| 2005/0216568 A1 | 9/2005 | Walkush et al. |
| 2005/0221845 A1 | 10/2005 | Benco et al. |
| 2005/0232247 A1 | 10/2005 | Whitley et al. |
| 2005/0234981 A1 | 10/2005 | Manousos et al. |
| 2005/0246216 A1 | 11/2005 | Rosen et al. |
| 2005/0283742 A1 | 12/2005 | Gusmorino et al. |
| 2006/0030370 A1 | 2/2006 | Wardimon |
| 2006/0031291 A1 | 2/2006 | Beckemeyer |
| 2006/0036766 A1 | 2/2006 | Baupin et al. |
| 2006/0038794 A1 * | 2/2006 | Shneidman ........... G06F 1/1626 345/173 |
| 2006/0053380 A1 | 3/2006 | Spataro et al. |
| 2006/0095417 A1 | 5/2006 | Chender et al. |
| 2006/0106675 A1 | 5/2006 | Cohen et al. |
| 2006/0123360 A1 | 6/2006 | Anwar et al. |
| 2006/0128364 A1 * | 6/2006 | Costa-Requena et al. 455/414.3 |
| 2006/0143157 A1 | 6/2006 | Landsman |
| 2006/0159099 A1 | 7/2006 | Hensley |
| 2006/0230128 A1 | 10/2006 | Chung et al. |
| 2006/0236349 A1 | 10/2006 | Lee |
| 2006/0282863 A1 | 12/2006 | Bushmitch et al. |
| 2006/0291506 A1 | 12/2006 | Cain |
| 2007/0030824 A1 | 2/2007 | Ribaudo et al. |
| 2007/0040891 A1 | 2/2007 | Calloway |
| 2007/0058647 A1 | 3/2007 | Bettis et al. |
| 2007/0081636 A1 | 4/2007 | Shaffer et al. |
| 2007/0124161 A1 | 5/2007 | Mueller et al. |
| 2007/0152979 A1 | 7/2007 | Jobs et al. |
| 2007/0186186 A1 | 8/2007 | Both et al. |
| 2007/0203979 A1 | 8/2007 | Walker et al. |
| 2007/0206086 A1 | 9/2007 | Baron et al. |
| 2007/0207844 A1 | 9/2007 | Pottinger et al. |
| 2007/0233377 A1 | 10/2007 | Salay et al. |
| 2007/0250784 A1 | 10/2007 | Riley et al. |
| 2007/0263828 A1 | 11/2007 | Lee et al. |
| 2007/0277110 A1 | 11/2007 | Rogers et al. |
| 2007/0282658 A1 | 12/2007 | Brintle |
| 2007/0297426 A1 | 12/2007 | Haveson et al. |
| 2008/0004002 A1 | 1/2008 | Chin et al. |
| 2008/0005168 A1 | 1/2008 | Huff et al. |
| 2008/0058010 A1 | 3/2008 | Lee |
| 2008/0059305 A1 | 3/2008 | Etuk et al. |
| 2008/0065726 A1 | 3/2008 | Schoenberg |

(56) References Cited

U.S. PATENT DOCUMENTS

| | | |
|---|---|---|
| 2008/0068447 A1 | 3/2008 | Mattila et al. |
| 2008/0081580 A1 | 4/2008 | Cole |
| 2008/0091782 A1 | 4/2008 | Jakobson |
| 2008/0107100 A1 | 5/2008 | Begeja et al. |
| 2008/0132252 A1 | 6/2008 | Altman et al. |
| 2008/0140785 A1 | 6/2008 | Farrenkopf et al. |
| 2008/0141247 A1 | 6/2008 | Saravanan |
| 2008/0144611 A1 | 6/2008 | Huang et al. |
| 2008/0152097 A1 | 6/2008 | Kent |
| 2008/0153459 A1 | 6/2008 | Kansal et al. |
| 2008/0155547 A1 | 6/2008 | Weber et al. |
| 2008/0159262 A1* | 7/2008 | Crable ............... H04L 12/66 370/352 |
| 2008/0174570 A1* | 7/2008 | Jobs et al. ................ 345/173 |
| 2008/0178105 A1 | 7/2008 | Loewenstein |
| 2008/0183744 A1 | 7/2008 | Adendorff et al. |
| 2008/0192732 A1 | 8/2008 | Riley et al. |
| 2008/0201143 A1 | 8/2008 | Olligschlaeger et al. |
| 2008/0201438 A1 | 8/2008 | Mandre |
| 2008/0221964 A1 | 9/2008 | Berkovitz et al. |
| 2008/0231545 A1 | 9/2008 | Gong |
| 2008/0235121 A1 | 9/2008 | Gonen |
| 2008/0240379 A1 | 10/2008 | Maislos et al. |
| 2008/0244582 A1 | 10/2008 | Brown et al. |
| 2008/0260347 A1 | 10/2008 | Widdowson |
| 2008/0261569 A1 | 10/2008 | Britt et al. |
| 2008/0270240 A1 | 10/2008 | Chu |
| 2008/0275701 A1 | 11/2008 | Wu et al. |
| 2008/0307322 A1 | 12/2008 | Stochosky et al. |
| 2008/0310604 A1 | 12/2008 | Agarwal et al. |
| 2009/0006936 A1 | 1/2009 | Parker et al. |
| 2009/0011743 A1 | 1/2009 | Johanson et al. |
| 2009/0013048 A1 | 1/2009 | Partaker et al. |
| 2009/0027480 A1 | 1/2009 | Choi |
| 2009/0030940 A1 | 1/2009 | Brezina et al. |
| 2009/0030988 A1 | 1/2009 | Kuhlke et al. |
| 2009/0037912 A1 | 2/2009 | Stoitsev et al. |
| 2009/0049140 A1 | 2/2009 | Stoddard et al. |
| 2009/0049447 A1 | 2/2009 | Parker |
| 2009/0054088 A1 | 2/2009 | Abrantes et al. |
| 2009/0055185 A1 | 2/2009 | Nakade et al. |
| 2009/0069038 A1* | 3/2009 | Olague et al. ............... 455/466 |
| 2009/0092133 A1 | 4/2009 | Mok et al. |
| 2009/0100462 A1 | 4/2009 | Park et al. |
| 2009/0136013 A1 | 5/2009 | Kuykendall et al. |
| 2009/0143052 A1 | 6/2009 | Bates et al. |
| 2009/0143053 A1 | 6/2009 | Levien et al. |
| 2009/0154468 A1* | 6/2009 | Donovan ................ 370/395.21 |
| 2009/0158200 A1 | 6/2009 | Palahnuk et al. |
| 2009/0161626 A1 | 6/2009 | Crawford et al. |
| 2009/0170480 A1 | 7/2009 | Lee |
| 2009/0174680 A1 | 7/2009 | Anzures et al. |
| 2009/0177484 A1 | 7/2009 | Davis et al. |
| 2009/0177754 A1 | 7/2009 | Brezina et al. |
| 2009/0177981 A1 | 7/2009 | Christie et al. |
| 2009/0193023 A1 | 7/2009 | Dzkiewicz et al. |
| 2009/0216569 A1 | 8/2009 | Bonev et al. |
| 2009/0222299 A1 | 9/2009 | Clemenson et al. |
| 2009/0226871 A1 | 9/2009 | Etuk et al. |
| 2009/0232288 A1 | 9/2009 | Forbes et al. |
| 2009/0233542 A1 | 9/2009 | Gratton et al. |
| 2009/0240564 A1 | 9/2009 | Boerries et al. |
| 2009/0249244 A1 | 10/2009 | Robinson et al. |
| 2009/0286540 A1 | 11/2009 | Huber et al. |
| 2009/0288007 A1 | 11/2009 | Leacock et al. |
| 2009/0298519 A1 | 12/2009 | Chan et al. |
| 2009/0298556 A1 | 12/2009 | Raffle |
| 2009/0307614 A1 | 12/2009 | Craig et al. |
| 2009/0320073 A1 | 12/2009 | Reisman et al. |
| 2009/0322893 A1 | 12/2009 | Stallings et al. |
| 2009/0327263 A1 | 12/2009 | Maghoul |
| 2009/0327953 A1 | 12/2009 | Honkala et al. |
| 2010/0001849 A1 | 1/2010 | Lee et al. |
| 2010/0020728 A1* | 1/2010 | Jefferson et al. ............. 370/260 |
| 2010/0050086 A1 | 2/2010 | Sherrard et al. |
| 2010/0050101 A1 | 2/2010 | Baik et al. |
| 2010/0058196 A1 | 3/2010 | Krishnan et al. |
| 2010/0064334 A1 | 3/2010 | Blackburn et al. |
| 2010/0077441 A1 | 3/2010 | Thomas et al. |
| 2010/0083253 A1 | 4/2010 | Kushwaha |
| 2010/0118158 A1 | 5/2010 | Boland et al. |
| 2010/0123816 A1 | 5/2010 | Koh et al. |
| 2010/0131691 A1 | 5/2010 | Chatterjee et al. |
| 2010/0138900 A1 | 6/2010 | Peterka et al. |
| 2010/0162133 A1 | 6/2010 | Pascal et al. |
| 2010/0162167 A1 | 6/2010 | Stallings et al. |
| 2010/0162171 A1 | 6/2010 | Felt et al. |
| 2010/0175000 A1 | 7/2010 | Gupta et al. |
| 2010/0180001 A1 | 7/2010 | Hardt |
| 2010/0185677 A1 | 7/2010 | Gupta et al. |
| 2010/0203833 A1 | 8/2010 | Dorsey |
| 2010/0205539 A1 | 8/2010 | Gestsson et al. |
| 2010/0223325 A1 | 9/2010 | Wendker et al. |
| 2010/0228560 A1 | 9/2010 | Balasaygun et al. |
| 2010/0251124 A1 | 9/2010 | Geppert et al. |
| 2010/0268793 A1 | 10/2010 | Wolff et al. |
| 2010/0280898 A1 | 11/2010 | Kasuya |
| 2010/0297592 A1 | 11/2010 | Gengler et al. |
| 2010/0304729 A1 | 12/2010 | Sabotta et al. |
| 2010/0322395 A1 | 12/2010 | Michaelis et al. |
| 2011/0035673 A1 | 2/2011 | Chou et al. |
| 2011/0044438 A1 | 2/2011 | Wang et al. |
| 2011/0047226 A1 | 2/2011 | Gabriel et al. |
| 2011/0053643 A1 | 3/2011 | Shmunis |
| 2011/0093544 A1 | 4/2011 | Yasrebi et al. |
| 2011/0093619 A1 | 4/2011 | Nelson |
| 2011/0106736 A1 | 5/2011 | Aharonson et al. |
| 2011/0115624 A1 | 5/2011 | Tran |
| 2011/0122827 A1* | 5/2011 | Bjorsell et al. ............... 370/328 |
| 2011/0126155 A1 | 5/2011 | Krishnaraj et al. |
| 2011/0145822 A1 | 6/2011 | Rowe et al. |
| 2011/0154244 A1 | 6/2011 | Howell et al. |
| 2011/0159854 A1 | 6/2011 | Kedefors et al. |
| 2011/0173111 A1 | 7/2011 | Cotton |
| 2011/0173112 A1 | 7/2011 | Cotton |
| 2011/0194466 A1* | 8/2011 | Kalele .................... H04M 3/56 370/261 |
| 2011/0209104 A1* | 8/2011 | Hinckley ............. G06F 3/0416 715/863 |
| 2011/0273576 A1 | 11/2011 | Zambetti et al. |
| 2011/0276885 A1 | 11/2011 | Gibson et al. |
| 2011/0276895 A1 | 11/2011 | Van Der Fiier et al. |
| 2011/0276896 A1 | 11/2011 | Zambetti et al. |
| 2011/0276901 A1 | 11/2011 | Zambetti et al. |
| 2011/0276903 A1 | 11/2011 | Mehin et al. |
| 2011/0282706 A1 | 11/2011 | Ezra et al. |
| 2012/0084366 A1 | 4/2012 | Killoran et al. |
| 2012/0084367 A1 | 4/2012 | Killoran et al. |
| 2012/0110087 A1 | 5/2012 | Culver et al. |
| 2012/0117471 A1 | 5/2012 | Amidon et al. |
| 2012/0136775 A1 | 5/2012 | Cotton |
| 2012/0158865 A1 | 6/2012 | Kurian et al. |
| 2012/0196581 A1 | 8/2012 | Papakipos et al. |
| 2012/0316962 A1 | 12/2012 | Rathod |
| 2013/0024818 A1 | 1/2013 | Rainisto et al. |
| 2013/0104246 A1 | 4/2013 | Bear et al. |
| 2013/0185190 A1 | 7/2013 | Cotton |
| 2013/0211865 A1 | 8/2013 | Cotton |
| 2013/0339461 A1 | 12/2013 | Killoran et al. |
| 2014/0006108 A1 | 1/2014 | Cotton |

FOREIGN PATENT DOCUMENTS

| | | |
|---|---|---|
| EP | 2567304 A1 | 3/2013 |
| EP | 2567543 A1 | 3/2013 |
| WO | WO 2011/140091 A1 | 11/2011 |
| WO | WO 2011/140098 A1 | 11/2011 |
| WO | WO 2011/140102 A1 | 11/2011 |
| WO | WO 2011/140104 A1 | 11/2011 |
| WO | WO 2011/140107 A1 | 11/2011 |
| WO | WO 2011/140122 A1 | 11/2011 |
| WO | WO 2011/140124 A1 | 11/2011 |
| WO | WO 2011/140127 A1 | 11/2011 |
| WO | WO 2011/140129 A1 | 11/2011 |

(56) References Cited

FOREIGN PATENT DOCUMENTS

OTHER PUBLICATIONS

U.S. Appl. No. 12/982,017; NonFinal Office Action dated Dec. 21, 2012; 31 pages.
U.S. Appl. No. 12/982,024; NonFinal Office Action dated Jan. 4, 2013; 29 pages.
U.S. Appl. No. 12/982,030; NonFinal Office Action dated Jan. 18, 2013; 29 pages.
International Preliminary Report on Patentability prepared by the International Bureau of WIPO for PCT International Patent Application No. PCT/US11/35006, mailed Nov. 6, 2012, 8 pages.
International Preliminary Report on Patentability prepared by the International Bureau of WIPO for PCT International Patent Application No. PCT/US11/35015, mailed Nov. 6, 2012, 7 pages.
International Preliminary Report on Patentability prepared by the International Bureau of WIPO for PCT International Patent Application No. PCT/US11/35019, mailed Nov. 6, 2012, 7 pages.
International Preliminary Report on Patentability prepared by the International Bureau of WIPO for PCT International Patent Application No. PCT/US11/35021, mailed Nov. 6, 2012, 7 pages.
International Preliminary Report on Patentability prepared by the International Bureau of WIPO for PCT International Patent Application No. PCT/US11/35025, mailed Nov. 6, 2012, 7 pages.
International Preliminary Report on Patentability prepared by the International Bureau of WIPO for PCT International Patent Application No. PCT/US11/35042, mailed Nov. 6, 2012, 7 pages.
International Preliminary Report on Patentability prepared by the International Bureau of WIPO for PCT International Patent Application No. PCT/US11/35044, mailed Nov. 6, 2012, 6 pages.
International Preliminary Report on Patentability prepared by the International Bureau of WIPO for PCT International Patent Application No. PCT/US11/35047, mailed Nov. 6, 2012, 8 pages.
International Preliminary Report on Patentability prepared by the International Bureau of WIPO for PCT International Patent Application No. PCT/US11/35049, mailed Nov. 6, 2012, 6 pages.
U.S. Appl. No. 12/773,742; NonFinal Office Action dated May 20, 2013; 29 pages.
U.S. Appl. No. 12/773,742; Final Office Action dated Nov. 7, 2013; 67 pages.
U.S. Appl. No. 12/773,742; NonFinal Office Action dated Apr. 23, 2014; 23 pages.
U.S. Appl. No. 12/773,747; NonFinal Office Action dated Mar. 19, 2013; 80 pages.
U.S. Appl. No. 12/773,747; Final Office Action dated Oct. 16, 2013; 24 pages.
U.S. Appl. No. 12/981,917; NonFinal Office Action dated Apr. 26, 2013; 28 pages.
U.S. Appl. No. 12/981,917; Final Office Action dated Oct. 11, 2013; 20 pages.
U.S. Appl. No. 12/981,917; Notice of Allowance dated Apr. 11, 2014; 32 pages.
U.S. Appl. No. 12/981,973; NonFinal Office Action dated May 14, 2013; 34 pages.
U.S. Appl. No. 12/981,973; Final Office Action dated Oct. 8, 2013; 30 pages.
U.S. Appl. No. 12/981,973; NonFinal Office Action dated Feb. 25, 2014; 39 pages.
U.S. Appl. No. 12/981,991; NonFinal Office Action dated Apr. 18, 2013; 49 pages.
U.S. Appl. No. 12/981,991; Final Office Action dated Sep. 4, 2013; 44 pages.
U.S. Appl. No. 12/981,991, NonFinal Office Action dated May 6, 2014; 55 pages.
U.S. Appl. No. 12/981,998; Final Office Action dated May 23, 2013; 27 pages.
U.S. Appl. No. 12/981,998; NonFinal Office Action dated Apr. 23, 2014; 28 pages.
U.S. Appl. No. 12/981,998; Restriction Requirement dated May 23, 2013; 5 pages.
U.S. Appl. No. 12/982,009; NonFinal Office Action dated Oct. 17, 2013; 28 pages.
U.S. Appl. No. 12/982,009; Final Office Action dated Apr. 30, 2014; 29 pages.
U.S. Appl. No. 12/982,017; Final Office Action dated May 22, 2013; 30 pages.
U.S. Appl. No. 12/982,017; NonFinal Office Action dated Apr. 23, 2014; 34 pages.
U.S. Appl. No. 12/982,024; Final Office Action dated Jun. 27, 2013; 28 pages.
U.S. Appl. No. 12/982,024; Advisory Action dated Sep. 11, 2013; 4 pages.
U.S. Appl. No. 12/982,024 NonFinal Office Action dated Apr. 23, 2014; 39 pages.
U.S. Appl. No. 12/982,030; Final Office Action dated Jun. 21, 2013; 26 pages.
U.S. Appl. No. 12/982,030; Advisory Action dated Aug. 29, 2013; 4 pages.
U.S. Appl. No. 12/982,030; NonFinal Office Action dated Jun. 24, 2014; 16 pages.
Brown et al., "Social Interaction in 'There'" (2004) University of Glasgow, Vienna Austria, pp. 1465-1468.
Emery, Using Jabberd as a Private Instant Messaging Service (2003) http://www.van emery.com/Linux/Jabber/jabberd.html, accessed on Mar. 7, 2013, 13 pages.
Johns, "iChat Information Pages" (2013) http://web.archive.org/web/20081231192828/http://www.ralphjohns.eo.uk/versions/ichatl/howtos 1.html, accessed on Mar. 8, 2013, 20 pages.
Round To It app (www.joeisanerd.com/apps/roundtoithelp/helpcontents.html, dated Jan. 12, 2010; www.didigetthingsdone.com/2009/01/19/round-toit-iphone-app-review/, dated Jan. 19, 2009, and www.joeisanerd.com/apps/roundtoithelp/credits.html, last accessed Apr. 19, 2014).
Wikipedia, "Instant Messaging" (2013) http://en.wikipedia.org/w/index.php?title=Instant_messaging&oldid=280025030, accessed on Mar. 7, 2013, 11 pages.
International Search Report and Written Opinion prepared by the U.S. Patent and Trademark Office as International Searching Authority for PCT International Patent Application No. PCT/US11/35006, mailed Aug. 5, 2011, 23 pages.
U.S. Appl. No. 12/773,742, filed May 4, 2010, Gibson et al.
U.S. Appl. No. 12/773,747, filed May 4, 2010, Zambetti et al.
U.S. Appl. No. 12/981,917, filed Dec. 30, 2010, Mehin et al.
U.S. Appl. No. 12/981,973, filed Dec. 30, 2010, Van der Flier et al.
U.S. Appl. No. 12/981,991, filed Dec. 30, 2010, Zambetti et al.
U.S. Appl. No. 12/981,998, filed Dec. 30, 2010, Van der Flier et al.
U.S. Appl. No. 12/982,009, filed Dec. 30, 2010, Zambetti et al.
U.S. Appl. No. 12/982,017, filed Dec. 30, 2010, Zambetti et al.
U.S. Appl. No. 12/982,024, filed Dec. 30, 2010, Zambetti et al.
U.S. Appl. No. 12/982,030, filed Dec. 30, 2010, Mehin et al.
U.S. Appl. No. 29/361,052, filed May 4, 2010, Van der Flier et al.
U.S. Appl. No. 29/361,056, filed May 4, 2010, Van der Flier et al.
International Search Report and Written Opinion prepared by the U.S. Patent and Trademark Office as International Searching Authority for PCT International Patent Application No. PCT/US11/35015, mailed Jul. 8, 2011, 13 pages.
International Search Report and Written Opinion prepared by the U.S. Patent and Trademark Office as International Searching Authority for PCT International Patent Application No. PCT/US11/35019, mailed Jul. 8, 2011, 12 pages.
International Search Report and Written Opinion prepared by the U.S. Patent and Trademark Office as International Searching Authority for PCT International Patent Application No. PCT/US11/35021, mailed Jul. 18, 2011, 15 pages.
International Search Report and Written Opinion prepared by the U.S. Patent and Trademark Office as International Searching Authority for PCT International Patent Application No. PCT/US11/35025, mailed Jul. 8, 2011, 12 pages.
International Search Report and Written Opinion prepared by the U.S. Patent and Trademark Office as International Searching Authority for PCT International Patent Application No. PCT/US11/35042, mailed Jul. 5, 2011, 13 pages.

(56) References Cited

OTHER PUBLICATIONS

International Search Report and Written Opinion prepared by the U.S. Patent and Trademark Office as International Searching Authority for PCT International Patent Application No. PCT/US11/35044, mailed Aug. 17, 2011, 12 pages.
International Search Report and Written Opinion prepared by the U.S. Patent and Trademark Office as International Searching Authority for PCT International Patent Application No. PCT/US11/35047, mailed Jul. 25, 2011, 13 pages.
International Search Report and Written Opinion prepared by the U.S. Patent and Trademark Office as International Searching Authority for PCT International Patent Application No. PCT/US11/35049, mailed Jul. 19, 2011, 12 pages.
Makela et al. (2009) Int. J. Communications, 3:169-247, "Mobility Trigger Management: Implementation and Evaluation".
Notification Concerning Availability of Publication of the International Application; PCT Patent Application No. PCT/US2011/035006; mailed Nov. 10, 2011; 1 page.
Notification Concerning Availability of Publication of the International Application; PCT Patent Application No. PCT/US2011/035015; mailed Nov. 10, 2011; 1 page.
Notification Concerning Availability of Publication of the International Application; PCT Patent Application No. PCT/US2011/035019; mailed Nov. 10, 2011; 1 page.
Notification Concerning Availability of Publication of the International Application; PCT Patent Application No. PCT/US2011/035021; mailed Nov. 10, 2011; 1 page.
Notification Concerning Availability of Publication of the International Application; PCT Patent Application No. PCT/US2011/035025; mailed Nov. 10, 2011; 1 page.
Notification Concerning Availability of Publication of the International Application; PCT Patent Application No. PCT/US2011/035042; mailed Nov. 10, 2011; 1 page.
Notification Concerning Availability of Publication of the International Application; PCT Patent Application No. PCT/US2011/035044; mailed Nov. 10, 2011; 1 page.
Notification Concerning Availability of Publication of the International Application; PCT Patent Application No. PCT/US2011/035047; mailed Nov. 10, 2011; 1 page.
Notification Concerning Availability of Publication of the International Application; PCT Patent Application No. PCT/US2011/035049; mailed Nov. 10, 2011; 1 page.
Oikarinen et al., "RFC 1459: Internet Relay Chat Protocol" (May 1993), 65 pages.
U.S. Appl. No. 12/773,742; Final Office Action dated Aug. 13, 2014; 26 pages.
U.S. Appl. No. 12/773,747; NonFinal Office Action dated Jan. 16, 2015; 117 pages.
U.S. Appl. No. 12/773,747; Notice of Publication dated Nov. 10, 2011; 1 page.
U.S. Appl. No. 12/981,998; Final Office Action dated Sep. 12, 2014; 38 pages.
U.S. Appl. No. 12/981,998; NonFinal Office Action dated Jan. 9, 2015; 31 pages.
U.S. Appl. No. 12/981,998; Notice of Publication dated Nov. 10, 2011; 1 page.
U.S. Appl. No. 12/982,017; Notice of Publication dated Nov. 10, 2011; 1 page.
U.S. Appl. No. 12/982,024 Notice of Publication dated Dec. 1, 2011; 1 page.
U.S. Appl. No. 12/982,030; Notice of Allowance & Interview Summary dated Dec. 10, 2014; 41 pages.
U.S. Appl. No. 12/982,030; Notice of Publication dated Nov. 10, 2011; 1 page.
U.S. Appl. No. 12/773,742; Notice of Publication dated Nov. 10, 2011; 1 page.
U.S. Appl. No. 12/981,917; Notice of Publication dated Nov. 10, 2011; 1 page.
U.S. Appl. No. 12/981,973; Final Office Action dated Jul. 18, 2014; 23 pages.
U.S. Appl. No. 12/981,973; Notice of Publication dated Nov. 10, 2011; 1 page.
U.S. Appl. No. 12/981,991; Final Office Action dated Oct. 24, 2014; 44 pages.
U.S. Appl. No. 12/981,991; Notice of Publication dated Nov. 10, 2011; 1 page.
U.S. Appl. No. 12/982,009; Notice of Publication dated Nov. 10, 2011; 1 page.
U.S. Appl. No. 12/982,017; Final Office Action dated Sep. 12, 2014; 42 pages.
U.S. Appl. No. 12/982,024; Final Office Action dated Oct. 23, 2014; 44 pages.
U.S. Appl. No. 12/981,973; NonFinal Office Action dated Mar. 27, 2015; 30 pages.
U.S. Appl. No. 12/981,991; NonFinal Office Action dated Feb. 23, 2015; 43 pages.
U.S. Appl. No. 12/773,742; NonFinal Office Action dated Jan. 15, 2015; 42 pages.
"Bulletin board system," from Wikipedia, May 1, 2009, downloaded Jul. 6, 2015; https://en.wikipedia.org/w/index.php?title=Bulletin_board_system&oldid=287208178.
"Internet Protocol," Sep. 1981; Information Sciences Institute, University of Southern California; 98 pages.
"Jott Assistant," archived Apr. 30, 2009 by the Internet Wayback Machine, downloaded Jul. 1, 2015 from http://web.archive.org/20090430012129/http://jott.com/jott/jott-assistant.html; 4 pages.
"WhatsApp FAQ" archived Feb. 26, 2010, by the Internet Wayback Machine, downloaded Jul. 8, 2015 from https://web.archive.org/web/20100222061103lhttp://www.whatsapp.com/faq/#18; see p. 6, "Why do you ask for my phone number?"; 10 pages.
U.S. Appl. No. 12/773,742; Final Office Action dated Aug. 14, 2015; 37 pages.
U.S. Appl. No. 12/773,747; Final Office Action dated Jul. 21, 2015; 36 pages.
U.S. Appl. No. 12/981,991; Final Office Action dated Jul. 16, 2015; 38 pages.
U.S. Appl. No. 12/981,998; Final Office Action dated Jun. 4, 2015; 40 pages.
U.S. Appl. No. 12/982,024; NonFinal Office Action dated Jun. 1, 2015; 44 pages.
U.S. Appl. No. 12/981,973; Final Office Action dated Oct. 8, 2015; 29 pages.
U.S. Appl. No. 12/982,024; Final Office Action dated Oct. 9, 2015; 44 pages.
U.S. Appl. No. 12/981,973; NonFinal Office Action dated Jan. 14, 2016; 30 pages.
U.S. Appl. No. 12/981,991; Notice of Allowance dated Feb. 2, 2016; 41 pages.
U.S. Appl. No. 12/981,998; NonFinal Office Action dated Feb. 10, 2016; 35 pages.
U.S. Appl. No. 12/981,973; Notice of Allowance dated Jul. 15, 2016; 26 pages.
U.S. Appl. No. 12/981,998; Final Office Action dated May 23, 2016; 38 pages.
U.S. Appl. No. 12/982,024; NonFinal Office Action dated Jun. 13, 2016; 45 pages.
U.S. Appl. No. 12/773,742; NonFinal Office Action dated Sep. 29, 2016; 33 pages.
U.S. Appl. No. 12/982,024; Final Office Action dated Oct. 3, 2016; 47 pages.

* cited by examiner

VIDEO CALL HANDLING

CROSS-REFERENCES TO RELATED APPLICATIONS

This application claims the benefit, under 35 U.S.C. §119(e), of provisional U.S. Application Ser. No. 61/331,337, filed on May 4, 2010 by Mehin et al. and entitled "Video Call Handling", the entire disclosure of which is incorporated herein by reference. This Application may also be related to the following commonly-assigned, co-pending applications (the "Related Applications"), the entire disclosure of each which is hereby incorporated by reference:

U.S. application Ser. No. 12/773,742, filed May 4, 2010, by Gibson et al. and entitled "Multi-Client Local Network Base Station";

U.S. application Ser. No. 12/773,747, filed May 4, 2010 by Zambetti et al. and entitled "Family Chat";

U.S. Application Ser. No. 12/981,917 (now U.S. Pat. No. 8,819,566), filed on a date even herewith by Mehin et al. and entitled "Integrated Multi-Modal Chat", which claims the benefit of provisional U.S. Application Ser. No. 61/331,311, filed on May 4, 2010 by Mehin et al. and entitled "Integrated Multi-Modal Chat";

U.S. application Ser. No. 12/981,973, filed on a date even herewith by van der Flier et al. and entitled "Conversation Capture" which claims the benefit of provisional U.S. Application Ser. No. 61/331,316, filed on May 4, 2010 by van der Flier et al. and entitled "Conversation Capture";

U.S. application Ser. No. 12/981,991 (now U.S. Pat. No. 9,356,790), filed on a date even herewith by Zambetti et al. and entitled "Multi-User Integrated Task List", which claims the benefit of provisional U.S. Application Ser. No. 61/331,318, filed on May 4, 2010 by Zambetti et al. and entitled "Multi-User Integrated Task List";

U.S. application Ser. No. 12/981,998, filed on a date even herewith by van der Flier et al. and entitled "Integrated Messaging Interface", which claims the benefit of provisional U.S. Application Ser. No. 61/331,319, filed on May 4, 2010 by van der Flier et al. and entitled "Integrated Messaging Interface";

U.S. application Ser. No. 12/982,009, filed on a date even herewith by Zambetti et al. and entitled "Video Recording Environment", which claims the benefit of provisional U.S. Application Ser. No. 61/331,339, filed on May 4, 2010 by Zambetti et al and entitled "Video Recording Environment";

U.S. application Ser. No. 12/982,017, filed on a date even herewith by Zambetti et al. and entitled "Photo Stack", which claims the benefit of provisional U.S. Application Ser. No. 61/331,341, filed on May 4, 2010 by Zambetti et al. and entitled "Photo Stack";

U.S. application Ser. No. 12/982,024 filed on a date even herewith by Zambetti et al. and entitled "Content-Driven Navigation", which claims the benefit of provisional U.S. Application Ser. No. 61/331,342, filed on May 4, 2010 by Zambetti et al. and entitled "Content-Driven Navigation"; and U.S. application Ser. No. 12/982,030 (now U.S. Pat. No. 9,003,306), filed on a date even herewith by Mehin et al. and entitled "Doodle-In-Chat Context", which claims the benefit of provisional U.S. Application Ser. No. 61/331,344, filed on May 4, 2010 by Mehin et al. and entitled "Doodle-In-Chat Context

FIELD

This disclosure relates, in general, to communications networks and services and, more particularly, to provision of enhanced communications and connectivity among users.

BACKGROUND

In many typical communications environments, users interact with communications services through a local network. For example, users within a home, office, enterprise branch location, etc. may interface with outside networks through routers and/or other network access systems. As voice, video, Internet, and other types of communications services converge, and as user network devices become increasingly portable, the network access systems are increasingly becoming hubs for substantially all user communications in proximity to the user's local network.

The increase in convergence and portability has provided many new types of user devices for interacting with communications services through the user's local network. However, there is typically little interactivity between the devices. As such, it may be difficult and/or inconvenient to use the devices in an integrative fashion, for example, to facilitate an integrated family or office environment.

In addition, while the increased functionality of personal communications technology has provided many benefits, many users, and in particular users within a household, have sometimes had difficulty in adapting that technology to household communications patterns. It therefore would be beneficial for modern household communications systems to conform more closely to household users' communication patterns, rather than forcing the household users to conform to usage patterns imposed by the technology.

BRIEF SUMMARY

Among other things, this disclosure describes tools and techniques for providing integrated, interactive communications services among multiple client devices in a local network. Some embodiments allow multiple user devices to be used in an integrative fashion to provide home management functionality, messaging functionality, videoconferencing functionality, cloud network interaction functionality, media sharing functionality, and/or other functionality. In another aspect, certain embodiments provide enhanced communication functionality by implementing chat, household activity tracking, media capture, and other communication functions in a manner that more closely conforms to typical household communications, resulting in an improve user experience, and in some cases, a more connected household.

One set of embodiments provides a communication system comprising a computing device. The communication system might also include other devices, such as a data store (which might take the form of a computer readable medium, and/or might include one or more databases, and/or the like), one or more display devices, one or more input devices, and one or more media capture devices (e.g., video capture devices, such as digital still or motion cameras, audio capture devices, such as microphones, and/or the like), all of which might be in communication with the computing device. In some cases, the data store, display devices, input devices, and/or media capture devices might be integrated within the computing device, while in other cases, they might be separate. In a particular aspect, the computing device might include (or be in communication with) one or more touch screens, which can serve as both a display device and an input device.

In an aspect, the computing device comprises at least one processor and at least one computer readable storage medium in communication with the at least one processor. The at least one computer readable storage medium might have encoded thereon a set of instructions that are executable by the processor to cause the computer system to perform one or more operations in accordance with the functionality of various embodiments, as described in further detail below and in the Related Applications. (It should be noted that, in some aspects, each of the Related Applications describe different feature sets that can be included and/or combined in any suitable fashion within particular embodiments.)

In some cases, the computing device might be a general purpose computer, while in others it might take the form of a personal media device, smart phone, tablet computer, and/or the like. In still other cases, the computing device might be a special-purpose device designed specifically to provide the described functionality.

According to another set of embodiments, the computing device might be part of a supersystem that provides interactive communications services within a local network. The supersystem might include a tablet system, a handset system, and/or a base station system, any (or all) of which can serve as the computing device according to various implementations. The tablet system might include a first client subsystem and a first user interface module configured to provide interactivity with first communications services provided by the first client subsystem, the first client subsystem being communicatively coupled with the local network and a second client subsystem. The handset system might include a second client subsystem and a second user interface module configured to provide interactivity with second communications services provided by the second client subsystem, the second client subsystem being communicatively coupled with the local network and the first client subsystem. The base station system might include a first interface subsystem configured to removably couple the base station with the tablet system and a second interface subsystem configured to removably couple the base station with the handset system.

In one set of embodiments, the set of instructions is executable by the processor to cause the computing device to perform one or operations that might be considered part of a method (which itself can be a separate embodiment). Thus, the tools provided by various embodiments can include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, in one embodiment, a communication system for facilitating enhanced communications might comprise a first computing device in communication with a service provider network and a local network. The first computing device might participate in an external communication session (e.g., a voice call, video call, etc.), via the service provider network, with an external communication device outside the communication system. In some embodiments, the communication system might further comprise a second computing device in communication at least with the local network. The second computing device might be configured to join the external communication session via an internal communication session with the first computing device over the local network. In an aspect, the first computing device might be configured to provide communication connectivity between the second computing device and the external communication device.

In some embodiments, the service provider network comprises a gateway device providing connectivity between the communication system and the external communication device. The external communication session, then, might comprise a communication session between the first computing device and the gateway device.

In some embodiments, the first computing device comprises a first camera and a first display screen, and the second computing device comprises a second camera and a second display screen. In an aspect, the first display screen might comprise a primary display area and a second display area; the primary display area might display video received from the external communication device. In another aspect, the secondary display area might display video captured by the second camera and transmitted from the second computing device to the first computing device over the internal connection.

In some cases, the first computing device is configured to transmit, over the external communication session, video captured by the first camera. The second computing device, however, might be configured to capture video with the second camera and request transmission of the captured video to the external communication device. In such a case, the communication system might be configured to terminate the communication session between the first computing device and the gateway device and/or to establish a new communication session between the second computing device and the gateway device. Hence, the second computing device then might provide communication connectivity between the first computing device and the external communication device, through the gateway device, without terminating a connection between the gateway device and the external communication device.

In some cases, the communication system can transmit graphical images, other than live video, during a video call. Merely by way of example, in one embodiment, the first computing device might be configured to receive user input indicating that the contents of the second display area should be displayed to a user of the external communication device. Based at least in part on the user input, the first computing device might be configured to transmit the contents of the second display area as video for reception by the external communication device. In an aspect of some embodiments, the second display area displays an application executing on the first computing device, and/or the user input might comprise dragging the contents of the second display area to the first display area.

In further embodiments, the external communication session comprises a voice call, and the first communication device is VoIP communication (which might include video) with a gateway device at the service provider network over an external session initiation protocol SIP session. In an aspect, the external communication device might comprise a POTS telephone, and/or the gateway device at the service provider network might comprise a VoIP-to-POTS gateway. The second computing device might join the call through initiating an internal SIP session with the first computing device, which might provide communication connectivity between the second computing device and the external communication device by bridging the internal SIP session of the second computing device with the external SIP session.

In another embodiment, the internal SIP session is a first internal SIP session, and the communication system further comprises a third computing device configured to join the voice call through a second internal SIP session with the second computing device. In this embodiment, the second computing device might be configured to provide communication connectivity between the third computing device and the external communication device by bridging the first internal SIP session of the second device and the second internal SIP session of the third device.

In other cases, the second computing device might leave the voice call through a SIP bye message. In such a case, the first computing device might not terminate the external communication session upon receipt of the SIP bye message from the second computing device. On the other hand, in some embodiments, if the first computing device leaves the voice call, the second computing device might establish a second external SIP session with the gateway device, such that the voice call continues between the second computing device and the external communication device, without participation of the first computing device.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1A:
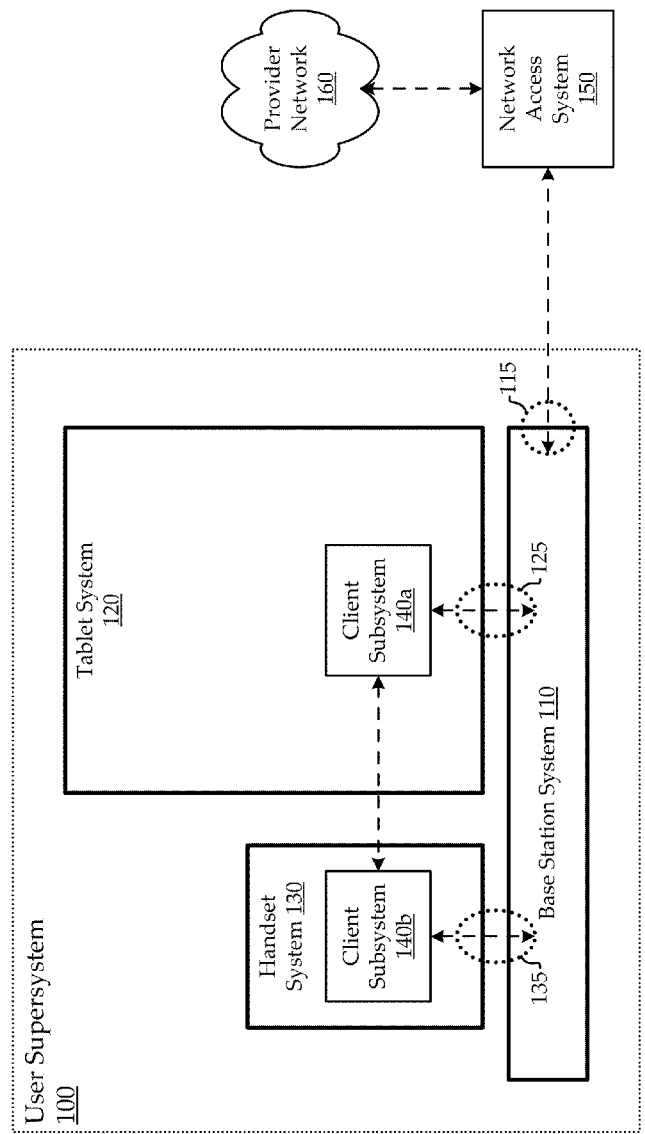
FIG. 1A shows a simplified block diagram of an illustrative user supersystem in communication with a provider network, according to various embodiments.

The present invention relates, in general, to communications networks and services and, more particularly, to providing video calling services through a multi-client communications hub.

In many typical communications environments, users interact with communications services through a local network. For example, users within a home, office, enterprise branch location, etc. may interface with outside networks through routers and/or other network access systems. As voice, video, Internet, and other types of communications services converge, and as user network devices become increasingly portable, the network access systems are increasingly becoming hubs for substantially all user communications in proximity to the user's local network.

The increase in convergence and portability has provided many new types of user devices for interacting with communications services through the user's local network. However, there is typically little interactivity between the devices. As such, it may be difficult and/or inconvenient to use the devices in an integrative fashion, for example, to facilitate an integrated family or office environment.

Embodiments allow multiple user devices to be used in an integrative fashion to provide home management functionality, messaging functionality, videoconferencing functionality, cloud network interaction functionality, media sharing functionality, and/or other functionality. According to some embodiments, a supersystem is provided that includes at least one base station and at least two clients. Functionality of the supersystem and its component systems will be appreciated through various illustrative embodiments described herein.

The following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

Turning first to FIG. 1A, a simplified block diagram is shown of an illustrative user supersystem 100 in communication with a provider network 160, according to various embodiments. The user supersystem 100 includes a base station system 110, a tablet system 120, and a handset system 130. Each of the tablet system 120 and the handset system 130 includes a client subsystem 140.

The user supersystem 100 interfaces with the provider network 160 via a network access system 150. As described more fully below, the network access system 150 may include a network interface device (NID), a router (e.g., a network address translation (NAT) router), and/or any other component used to provide subnet functionality. For example, because of the network access system 150, the user supersystem 100 may operate in the context of a local network. As used herein, "local network," "user network," "home network," and similar phraseology is used broadly and interchangeably to include any type of subnet, like a local area network (LAN). It is understood that different types of local networks may be used in various embodiments without departing from the scope of the invention. For example, different local networks may operate using different protocols, different types of security, different architectures or topologies, etc.

In various embodiments, the tablet system 120, the handset system 130, and/or the base station system 110 are configured to provide interactive communications services to the client subsystems 140 within the local network. For example, the tablet system 120 and the handset system 130 may provide a user with communications functionality for interacting with a public network (e.g., the Internet), with the provider network 160 (e.g., for various provider services, like cloud storage and application serving), with other devices on the local network (e.g., computers, smart appliances, baby monitors, networked televisions, etc.), etc. Further, as described more fully below, the interactive communications functionality may include integrations between the tablet system 120 and the handset system 130 (e.g., application hand-offs and integrations, off-loading, etc.). The various features of the user supersystem 100 are implemented through its various component systems—the base station system 110, the tablet system 120, and the handset system 130. Each of these components systems will be described in turn.

Embodiments of the base station system 110 are configured with different types of functionality. In some embodiments, the base station system 110 is configured as a base for mounting one or both of the tablet system 120 and the handset system 130. For example, a tablet interface region 125 and a handset interface region 135 may be configured to physically receive a portion of the tablet system 120 and handset system 130, respectively (e.g., for docking). In another embodiment, the base station system 110 is configured as a special-purpose mount for interfacing the tablet system 120 and/or the handset system 130 with a fixture or other element (as an under-cabinet mount).

According to other embodiments, the base station system 110 includes charging functionality for charging the tablet system 120 and/or the handset system 130. For example, the charging may be contactless (e.g., by induction) or by physical ports and/or cables configured to interface with cables and/or ports on the respective tablet system 120 or handset system 130. According to still other embodiments, the base station system 110 includes communications functionality. Embodiments of the base station system 110 may be configured to provide the functionality of a wireless fidelity (WiFi) hotspot, a wireless repeater, a network hub, a network router (e.g., with or without network address translation (NAT) functionality), a picocell or femtocell, etc. For example, as shown, the base station system 110 may include a network interface region 115 for interfacing with the network access system 150. Certain embodiments may provide interactive communications between the provider network 160 (e.g., and/or other networks) and the client subsystems 140 (e.g., via the tablet interface region 125 and the handset interface region 135). These and other functions of the base station system 110 will be described more fully below (e.g., with reference to FIG. 4).

Other functionality of the user supersystem 100 is provided by the tablet system 120, the handset system 130, and/or their respective client subsystems 140. Embodiments of the tablet system 120 are typically implemented substantially as a tablet computing environment. The tablet system 120 may include a large display. The display may be active or passive; responsive to touch by a finger, stylus, or other implement; responsive to remote interactions, etc. Other interactivity may be provided by voice capture (e.g., audio-to-text translation, direct voice recording, etc.), by motion capture (e.g., gestures, etc.), and or in any other useful way.

In some embodiments, the tablet system 120 includes additional input/output components or features. Embodiments include a still and/or video capture device (e.g., a digital video camera), an integrated speaker, and/or ports (e.g., physical and/or logical) for interfacing with peripheral devices. For example, the tablet system 120 may be configured to interface with peripheral cameras, keyboards, printers, scanners, sensors, etc. In certain embodiments, the tablet system 120 interfaces with one or more peripherals via the base station system 110. For example, the base station system 110 may include a USB hub or a Bluetooth receiver, by which the tablet system 120 interfaces with a compatible keyboard.

In some embodiment, a digital video camera is integrated within the chassis of the tablet system 120, such that it can be pointed in various directions. In one embodiment, the camera swivels to point either in a direction substantially normal to the display (e.g., typically toward the primary user of the tablet system 120) or in an opposite direction (e.g., typically away from the primary user of the tablet system 120). Video captured by the camera may also be displayed substantially in real time on the display.

For example, suppose a first user employs the tablet system 120 to place a video call with a second user to show off a new home renovation. The first user may be able to see both the first user's camera input and the second user's camera input (e.g., as picture-in-picture, side-by-side, etc.) on the first user's display. By pointing the camera in a direction opposite the display and walking around the renovation with the tablet system 120, the first user may see both what the second user is seeing (i.e., the new renovation video capture) and the second user's reaction on the same display at the same time.

Embodiments of the handset system 130 provide various types of functionality, some similar to that of the tablet system 120. The handset system 130 may typically be implemented in a physical format similar to that of a cell phone, personal digital assistant (PDA), remote control, etc. (i.e., portable and ergonomic). The handset system 130 may be configured to receive user interactions through various types of controls. For example, some or all of the controls may be implemented as soft controls through a touch screen, additional controls may be implemented as hard buttons, etc. In certain embodiments, the handset system 130 includes a camera. In one embodiment, the camera is substantially identical to that of the tablet system 120. Of course, the handset system 130 may include additional components, such as microphones and speakers, ports and jacks, etc.

Notably, as described more fully below, embodiments of the tablet system 120 and the handset system 130 are designed and configured to provide an integrated experience. Using the example above, suppose a first user has employed the tablet system 120 to place a video call with a second user to show off a new home renovation. During the call, the first user decides that it would be more convenient to walk around with the handset system 130. The first user may pick up the handset system 130 and continue the call (e.g., substantially seamlessly hand off the video call from the tablet system 120 to the handset system 130). In one embodiment, the tablet system 120 and/or the handset system 130 may display a soft button (e.g., "send to handset") to execute the hand-off. In another embodiment, removing the handset system 130 from the base station system 110 may automatically initiate the hand-off. In another embodiment, moving the handset system 130 out of direct proximity to the tablet system 120 (e.g., separating them by more than eighteen inches) may automatically initiate the hand-off.

While the tablet system 120 and the handset system 130 are described above with reference to certain hardware components (e.g., cameras, displays, etc.), it will be appreciated that much of the functionality of those systems is in fact implemented by their respective client subsystems 140. In various embodiments, each client subsystem 140 may be a "hard" client subsystem 140, a "soft" client subsystem 140, or some combination. For example, the client subsystem 140 may be implemented, in whole or in part, in hardware. Thus, it may include one or more Application Specific Integrated Circuits (ASICs) adapted to perform a subset of the applicable functions in hardware. Alternatively, the functions may be performed by one or more other processing units (or cores), on one or more integrated circuits (ICs). In other embodiments, other types of integrated circuits may be used (e.g., Structured/Platform ASICs, Field Programmable Gate Arrays (FPGAs), and other Semi-Custom ICs), which may be programmed. Each may also be implemented, in whole or in part, with instructions embodied in a computer-readable medium, formatted to be executed by one or more general or application specific controllers.

In some embodiments, as illustrated by the dashed line between client subsystems 140, there may be communications between the client subsystems 140. In some embodiments, the communications are direct between components of the client subsystems 140 themselves. In other embodiments, the communications are routed through components of the tablet system 120 and the handset system 130. In still other embodiments, the communications are routed through components of the base station system 110. And in other embodiments, the communications are routed through one or more other components of the local network, for example, the network access system 150.

Figure 1B:
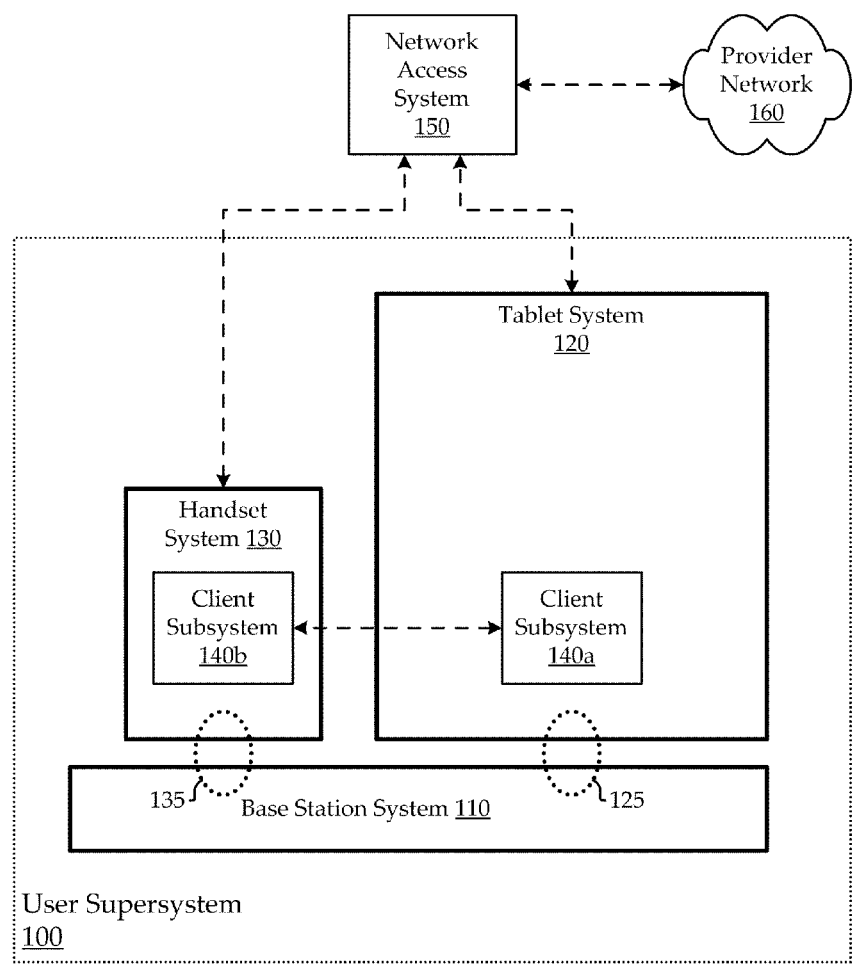
FIG. 1B shows a simplified block diagram of another illustrative user supersystem in communication with a provider network, where the base station system provides little or no communications functionality, according to various embodiments.

It will be appreciated that many types of user supersystem 100 are possible with many types and/or numbers of component systems. For the sake of illustration, some of these alternate embodiments are described with reference to FIGS. 1B and 1C. For example, in some embodiments, the base station system 110 does not provide any communications functionality. FIG. 1B shows a simplified block diagram of another illustrative user supersystem 100 in communication with a provider network 160, where the base station system 110 provides little or no communications functionality, according to various embodiments.

As in FIG. 1A, the user supersystem 100 includes a base station system 110, a tablet system 120, and a handset system 130. Each of the tablet system 120 and the handset system 130 includes a client subsystem 140. In the embodiment of FIG. 1B, however, the network access system 150 is illustrated as being in direct communication with the tablet system 120 and the handset system 130, and not through the base station system 110. For example, each of the tablet system 120 and the handset system 130, and/or their respective client subsystems 140, may be configured to communicate directly with the local network (e.g., with the network access system 150.

It is worth noting that, where the base station system 110 does not provide communications functionality, there may be no need for a network interface region 115. Further, there may be no need to provide communications via the tablet interface region 125 or the handset interface region 135. For example, unlike in the embodiment of FIG. 1A, there may be no physical and/or logical (e.g., unwired) communications path between the base station system 110 and the tablet system 120 or the handset system 130 via the tablet interface region 125 or the handset interface region 135, respectively. Still, interface regions of the base station system 110 may provide various types of mounting functionality, charging functionality, etc., for example, as described above.

Figure 1C:
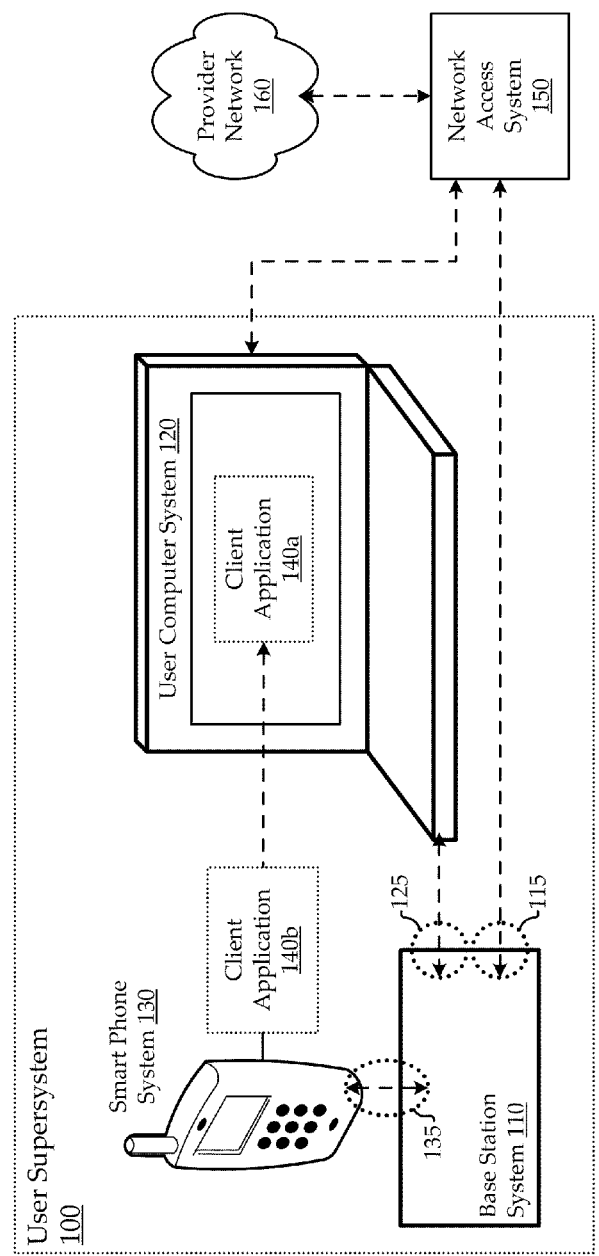
FIG. 1C shows a simplified block diagram of yet another illustrative user supersystem in communication with a provider network, where the base station system physically interfaces only with the tablet system, and where certain standard tablet system and handset system components are used, according to various embodiments.

FIG. 1C shows a simplified block diagram of yet another illustrative user supersystem 100 in communication with a provider network 160, where the base station system 110 physically interfaces only with the tablet system 120, and where certain standard tablet system 120 and handset system 130 components are used, according to various embodiments. Again, as in FIG. 1A, the user supersystem 100 includes a base station system 110, a tablet system 120, and a handset system 130, and each of the tablet system 120 and the handset system 130 includes a client subsystem 140.

As illustrated, the tablet system 120 may be implemented as a standard (e.g., multi-purpose, undedicated) laptop or tablet computing environment, and the handset system 130 may be implemented as a standard smart phone environment. The client subsystems 140 are also shown as client applications. For example, some functionality of the client subsystem 140b shown as part of the handset system 130 of FIG. 1A may be implemented as an application running on a standard smart phone. In alternate embodiments, a dedicated handset system 130 (e.g., as shown in FIG. 1A) may be used with a standard tablet system 120 (e.g., as shown in FIG. 1C), or a standard handset system 130 (e.g., as shown in FIG. 1C) may be used with a dedicated tablet system 120 (e.g., as shown in FIG. 1A).

Other types of base station system 110 may be used as well, according to various embodiments. For example, as illustrated, the base station system 110 may be configured to physically interface with (e.g., provide docking for) the handset system 130 via a handset interface region 135, and to provide communications with the tablet system 120 via the tablet interface region 125 (e.g., by a wired or unwired communications path).

Further, the user supersystem 100 may interface with the local network in various ways. As illustrated, the base station system 110 is in communication with the network access system 150, the tablet system 120 is shown in communication both with the base station system 110 and with the network access system 150, and the handset system 130 is shown in communication only with the base station system 110. Of course, in alternate embodiments, the base station system 110 may not be in communication with the local network (e.g., as described with reference to FIG. 1B), the handset system 130 may have a direct communications path to the network access system 150, etc.

Figure 2:
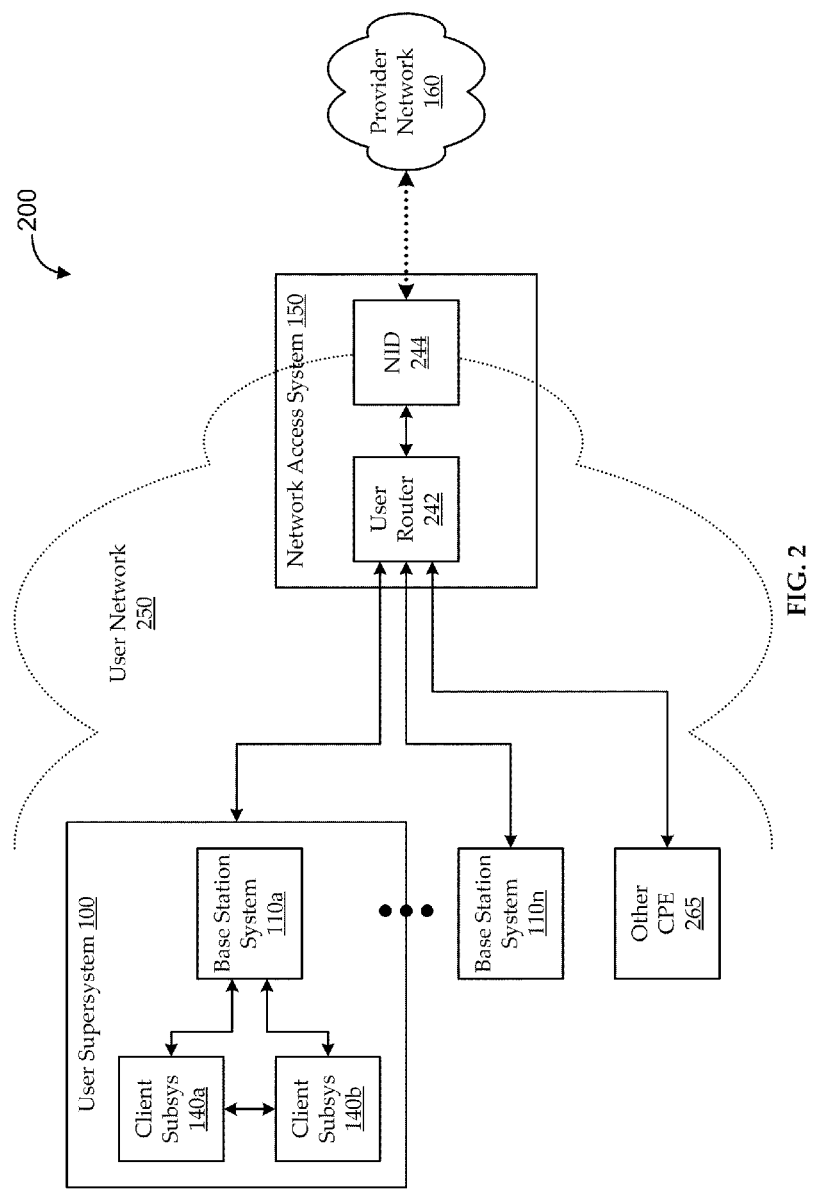
FIG. 2 shows a communications system that includes a user network having multiple clients, according to various embodiments.

While each of the illustrative embodiments shown in FIGS. 1A—1C shows a single user supersystem 100 alone in its local network, user supersystems 100 may operate in the context of other devices in a local network. FIG. 2 shows a communications system 200 that includes a user network 250 having multiple clients, according to various embodiments. As illustrated, the user network 250 includes a user supersystem 100 and other devices in communication with a provider network 160 via a network access system 150.

It will be appreciated that many types of provider network 160 are possible. For example, the provider network 160 may include a cable, direct subscriber line (DSL), satellite, and/or other type of network topology. Further, different types of provider networks 160 may include different topologies or architectures between portions of the provider network 160 and between other networks, such as the Internet.

For example, according to one type of network topology, access networks from individual customers are aggregated in one or more locations within the provider network 160 (e.g., apartment access networks maybe aggregated at a building level, again at a neighborhood level, again at a service area level, etc.), with various aggregated regions being serviced by one or more main provider locations (e.g., central offices). At those or other locations, the provider network 160 may interface with other networks, for example, through various types of peering relationships, etc. Typically, non-customers may interface with customers in the provider network 160 through the public network.

As such, different types of network architectures and topologies may be used with various embodiments, such that different types of components may be required and/or desired at a user's premises to interface with an access portion of the provider network 160. For example, various types of receivers, ports, modems, etc. may be used at the user premises to interface the user's user network 250 with the provider network 160. The interface between the user network 250 and the provider network 160 may be implemented by components of the network access system 150.

In one embodiment, the network access system 150 includes a NID 244 and a user router 242. The NID 244 may include some or all of the components used to interface the user's access portion of the provider network 260 (e.g., the phone line, cable, fiber, etc. going to the user's home) with the user's premises. The NID 244 may be mounted internal or external to the user's premises (e.g., or some combination), and may include regions that are restricted to the user (e.g., accessible only to a service provider). In various embodiments, the NID 244 may provide various types of functionality, including network address translation, switching, routing, filtering, serving (e.g., using a micro-server), storage, cooling, monitoring, etc.

In embodiments where the NID 244 does not include a router or where additional routing is desired, the network access system 150 may further include the user router 242. The user router 242 may include a network address translator (NAT) router, a port address translation (PAT) device, a single-address NAT, a port-level multiplexed NAT, a static or dynamic NAT, a firewall, etc. The router may be particularly useful where multiple devices within the user network 250 are being used to communicate outside the user network 250, as in FIG. 2.

Regardless of the particulars of the provider network 160 and the network access system 150, the result may be manifest as a local user network 250. For example, the network access system 150 may include any components or functionality desired to provide services from the provider network 160 to the user network 250 and/or among the devices within the user network 250, such that the user network 250 operates as a subnet.

As illustrated, the user network 250 may include a user supersystem 100, an additional base station system 110*n*, and one or more other customer premises equipment (CPE) devices 265. For example, the CPE devices 265 may include computer systems (e.g., laptops, personal computers, tablet computers, etc.), television equipment (e.g., networked or Internet-enabled television sets, set-top boxes, etc.), smart phones, smart appliances (e.g., networked lighting, refrigerators, water heaters, etc.), sensor equipment (e.g., smoke or radon alarms, thermostats, baby monitors, etc.), etc. Of course, any other types or numbers of devices or systems may be included in the user network 250. Each of these devices or systems may be in direct or indirect communication with the network access system 150 (e.g., via the user router 242).

Multiple base station systems 110 may be used in a topology, like the one illustrated in FIG. 2, to provide certain enhanced functionality. As described above, the base station systems 110 may be configured to provide certain types of communications functionality. For example, the base station systems 110 may act as Wi-Fi hotspots or repeaters. When there are multiple base station systems 110 in the user network 250, the client subsystems 140 may be configured to interface with the base station system 110 having the strongest signal (e.g., or the closest base station system 110, the base station system 110 having certain functionality, etc.).

It will be appreciated that these and/or other techniques may be used to provide a substantially ubiquitous unwired connectivity experience throughout the user's premises. Notably, changes in signal integrity may affect apparent latency, error rates, bandwidth, and/or other connectivity conditions. For example, as a home user moves between room or floors, and even external to the home within some range, it may be desirable for the user to experience a substantially consistent connectivity experience.

For example, the user supersystem 100 is illustrated as including two client subsystems 140 in communication with each other and with a first base station system 110*a*. If one or both of the client subsystems 140 is moved out of operational range of the first base station system 110*a* and into operational range of a second base station system 110*n*, the one or both client subsystems 140 may automatically switch to being in communication with the second base station system 110*n*. Accordingly, the user supersystem 100 definition may dynamically update to capture changes in topology.

For the sake of illustration, a customer calls a fabric seller to inquire about a particular fabric. A video session is initiated, beginning with the fabric seller sitting at her desk in front of the tablet system 120 of her user supersystem 100 (e.g., acting as a first client subsystem 140*a*). She desires to show the customer the requested fabric, while also illustrating the breadth of her fabric stock and the attractiveness of her storefront to entice the customer to visit in person. To this end, she seamlessly hands the video session off to her handset system 130 (e.g., acting as a second client subsystem 140b) and virtually walks the customer (i.e., via real-time video capture) through the store to the location of the requested fabric, all the while remotely watching the customer's reaction on the handset system 130 display. The requested fabric is located on the second floor of the store, far from the base station system 110 (e.g., which may be collocated with the tablet system 120). However, the fabric seller has an additional base station system 110 configured as a repeater on the second floor for boosting the signal in that area of the store (e.g., for when the handset system 130 is in proximity). As such, she is able to maintain a high quality, real-time video stream with her customer throughout the communications session.

It will be appreciated that other types of integrations are possible in a user network 250, like the one illustrated in FIG. 2. For example, as described above, the client subsystems 140 may interact and/or be integrated with each other. Further, in certain embodiments, the client subsystems 140 may be configured to interface with one or more other CPE devices 265. For example, the tablet system 120 may be configured to display a monitor of current energy use by smart appliances in the home, to remotely control lights and/or other devices in the home, to monitor a closed caption video feed (e.g., from a security system), etc. These types of integrations may be implemented by direct communication links, through one or more base station systems 110, through components of the network access system 150, through other devices in the user network 250, etc.

Of course, it may be desirable for devices or systems in one user network 250 to interface with devices or systems in another user network 250. Each of the illustrative embodiments shown in FIGS. 1A—1C shows only a single user supersystem 100, and the embodiment of FIG. 2 shows only a single user network 250. However, user supersystems 100 may typically operate in the context of a larger communications system having multiple users with multiple user networks 250, each having multiple devices and systems.

Figure 3:
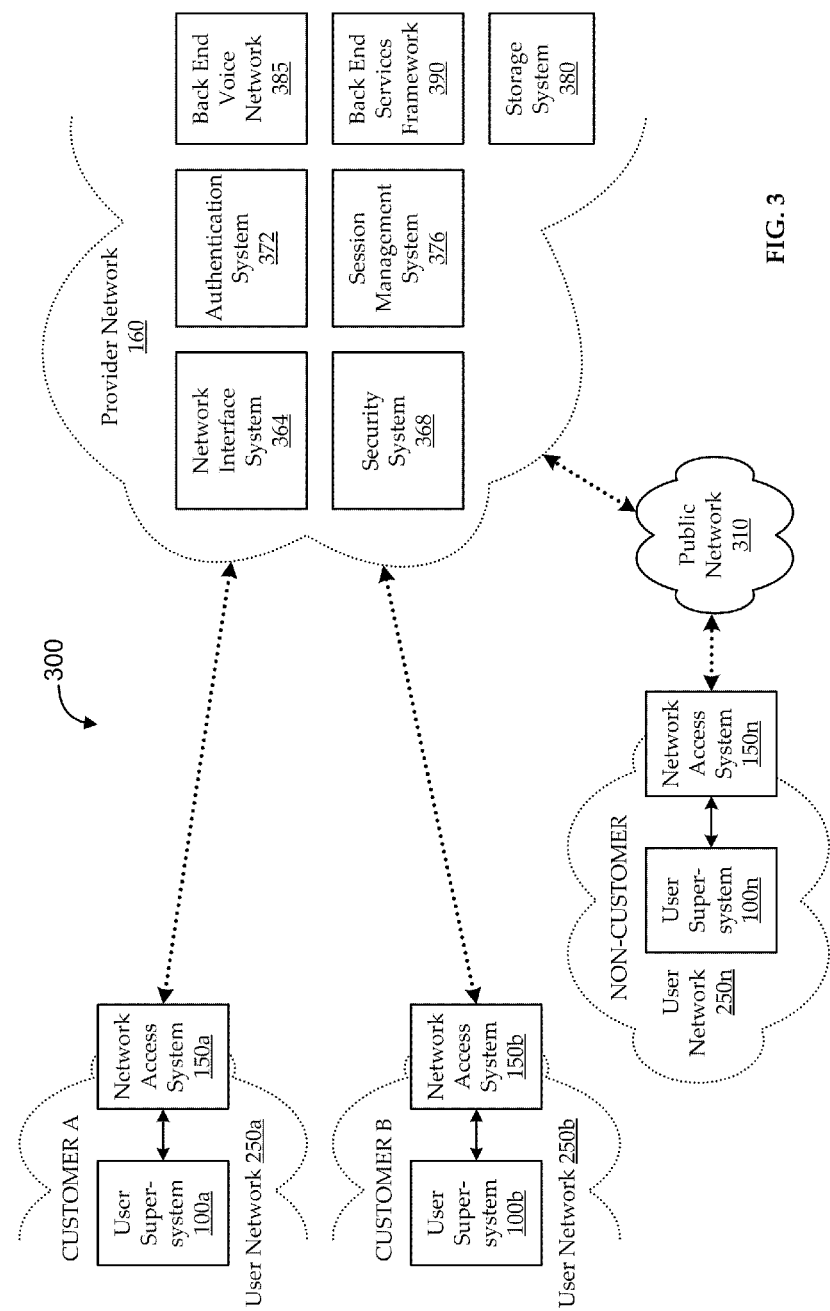
FIG. 3 shows a communications system that includes multiple user networks, according to various embodiments.

FIG. 3 shows a communications system 300 that includes multiple user networks 250, according to various embodiments. As illustrated, the user network 250 includes a user supersystem 100 in communication with a common provider network 160 via a network access system 150. Notably, a first user network 250a is associated with a first customer ("Customer A") of the service provider associated with the provider network 160, a second user network 250b is associated with a second customer ("Customer B") of the service provider, and a third user network 250c is associated with a user that is not a customer of the service provider ("Non-Customer").

As described above, in some network topologies, customers may be in substantially direct communication with the provider network 160, while non-customers may have access to the provider network 160 only through the public network 310 (e.g., the Internet). In certain embodiments, the communications to and from the respective network access systems 150 are substantially the same, regardless of whether the user network 250 is associated with a customer. In other embodiments, certain additional or alternate functionality is available to customers. For example, when the service provider has less or no control over the access network to a user (e.g., for non-customers), provision of certain services may be difficult, impractical, or impossible (e.g., provision of certain services may be to slow, too costly, etc. when offered through the public network). In still other embodiments, various types of relationships (e.g., peering relationships, content delivery or mirroring relationships, etc.) may be used to provide similar services to both customers and non-customers.

Typically, services are provided by the service provider from the provider network 160. As illustrated, the provider network 160 may be described in terms of a number of functional blocks. For example, the provider network 160 may include a network interface system 364, a security system 368, an authentication system 372, a session management system 376, a storage system 380, a back-end voice network 385, and a back-end services framework 390. Notably, these functional blocks may, in fact, be collocated or distributed, implemented in one or more components or systems, implemented in hardware or software, etc., according to various embodiments. As such, descriptions of functionality of the provider network 160 in this context is intended to add clarity to the description and should not be construed as limiting the scope of embodiments.

In some embodiments, communications to and from various user networks 250 (e.g., via their respective network access systems 150) interface with the provider network 160 at the network interface system 364. Embodiments of the network interface system 364 may include any type of components, subsystems, etc. for interfacing with the user access networks, with the public network 310, and/or with additional networks (e.g., content delivery networks (CDNs), back-haul networks, peer networks, proprietary networks, etc.). For example, the network interface system 364 may include and handle various ports and connections, implement signal processing functions (e.g., modulations and demodulations), implement protocol handling, etc.

In some embodiments, communications are further handled by the security system 368. For example, it may be desirable for functionality of the network interface system 364 to be enhanced with logical security (e.g., firewalls, encryption, etc.) and/or with physical security (e.g., locked servers, etc.). Notably, functionality of the security system 368 may be further applied to other systems of the provider network 160. For example, physical and/or logical security may be applied to some or all of the authentication system 372, storage system 380, etc.

In addition to the types of security provided by the security system 368, other types of user (e.g., or device, system, network, etc.) authentication may be desired. Embodiments of the authentication system 372 are used for authorization, authentication, accounting, registration, and/or other similar functionality. For example, the authentication system 372 may include functionality of an "Authentication, Authorization, and Accounting" (AAA) server, a "Remote Authentication Dial In User Service" (RADIUS), etc. In one embodiment, the network interface system 364 implements a Network Access Server (NAS) in communication with a RADIUS server implemented by the authentication system 372.

In other embodiments, the authentication system 372 may be used to perform other types of authentication and registration. In one embodiment, new devices in a user network 250 may send a registration request to the authentication system 372, which may keep track of and/or authorize user devices. In another embodiment, individual communications sessions are authorized, registered, etc. by the authentication system 372. In still another embodiment, the authentication system 372 handles authentication credentials of non-customers (e.g., using cookies, etc.), content providers, etc. In yet other embodiments, the authentication system 372 handles additional accounting functions, such as usage tracking against fair access policies (FAPs), etc.

As discussed above, embodiments of the user supersystems 100 provide interactive communications functionality via client subsystems 140. In some embodiments, certain functionality is provided in the context of communication sessions. For example, session streams may be used to manage large numbers of simultaneous communications transactions occurring over the communications network 300 (e.g., chat sessions, voice or video calls, messaging, content delivery, etc.). In some embodiments, these session streams are handled by the session management system 376.

Embodiments of the session management system 376 may manage session in various ways, depending on the type of session. For example, certain embodiments may manage and/or contribute to classifications of service flows as unicast, multicast, broadcast, simulcast, etc. As such, the session management system 376 may be configured to assign and manage session identifiers, handle session persistence, handle session protocol usage, etc. In some embodiments, the session management system 376 implements the Session Initiation Protocol (SIP) for some or all of the session streams. For example, SIP may be used by the session management system 376 as a signaling protocol, for handling multi-user communications, including streaming media, voice or video calls (e.g., voice over Internet protocol (VoIP) calls), instant messaging, real-time gaming, etc.

It will be appreciated that the network interface system 364, security system 368, authentication system 372, session management system 376, and/or other functional blocks of the provider network 160 may effectively provide various front-end types of functionality. For example, services delivered to the users may be provided by back-end systems, other content sources, etc. The front-end functional blocks described my, thus, effectively mediate provision of those services to users via their respective client subsystems 140.

As illustrated, back-end functionality may be provided by the back-end voice network 385, the back-end services framework 390, and the storage system 380. For example, voice calls and certain data flows may be handled by the back-end voice network 385. Embodiments of the back-end voice network 385 may include the plain old telephone service (POTS) network and/or other voice networks, such as packet-switched networks (e.g., via fiber-optic networks, DSL networks, etc.).

Embodiments of the back-end services framework 390 include and/or interface with all other service provision of the provider network 160. In some embodiments, the back-end services framework 390 provides integrated messaging functionality. For example, different types of messaging capabilities may be provided between user supersystems 100, between different client subsystems 140, from a user supersystem 100 to other user devices inside or outside of the user network 250, etc. The messaging functionality may include e-mail messaging, Short Message Service (SMS) messaging, video messaging, etc.

The back-end services framework 390 may also provide various cloud computing and/or content serving functionality. For example, in certain embodiments, the storage system 380 includes a storage area network (SAN) within the provider network 160. In other embodiments, the storage system 380 includes, or is in communication with, data storage (e.g., servers) over external networks. For example, the storage system 380 may include third-party storage offered over the Internet. The back-end services framework 390 may use the storage system 380 to provide functionality, including, for example, content mirroring, application serving, and cloud-based address books, photo albums, calendars, etc.

It will be appreciated that other functionality may be provided by embodiments of the back-end services framework 390 and/or other components of the provider network 160. Of course, much of the functionality described with reference to components of the provider network 160 may related to (e.g., rely on, be further integrated with, be enhanced by, etc.) components of the user supersystem 100. For the sake of additional clarity, embodiments of some functional components of illustrative base station systems 110 and client subsystems 140 are described with reference to FIGS. 4 and 5, respectively.

Figure 4:
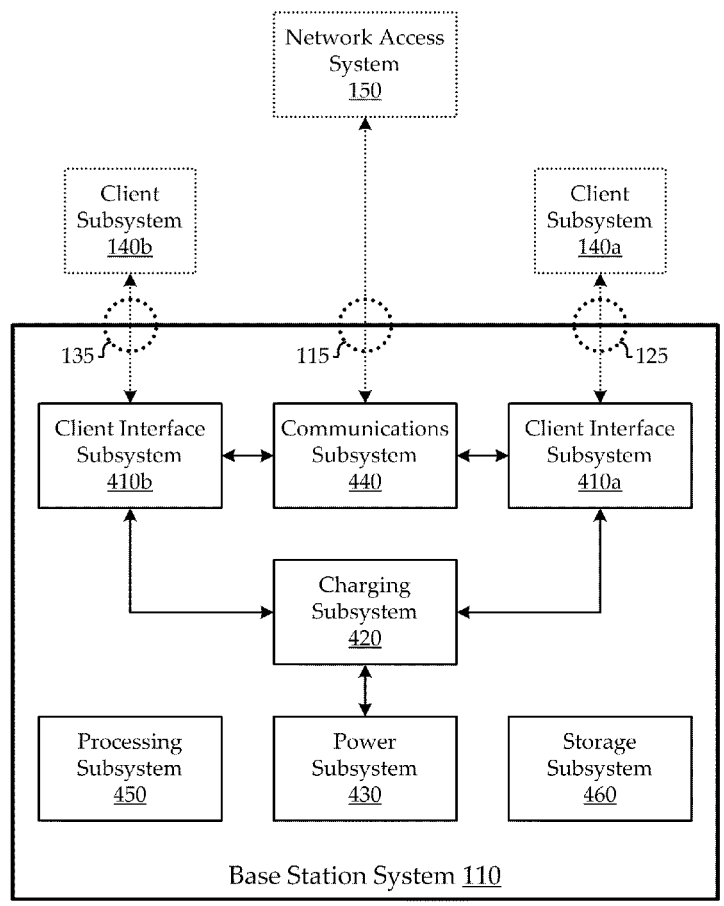
FIG. 4 shows a functional block diagram of a base station system in the context of certain other devices and systems, according to various embodiments.

FIG. 4 shows a functional block diagram of a base station system 110 in the context of certain other devices and systems, according to various embodiments. For example, embodiments of the base station system 110 may be implemented substantially as described with reference to FIG. 1A. For the sake of clarity and to add context to the description, the base station system 110 is shown in communication with a first client subsystem 140a, a second client subsystem 140b, and a network access system 150 via a tablet interface region 125, a handset interface region 135, and a network interface region 115, respectively. It will be appreciated from the descriptions above that many other arrangements are possible according to other embodiments. As such, the context should not be construed as limiting the scope of the embodiments.

Many functions of embodiments of the base station system 110 are provided by various functional blocks. As illustrated the functional blocks may include one or more client interface subsystems 410, a charging subsystem 420, a power subsystem 430, a communications subsystem 440, a processing subsystem 450, and a storage subsystem 560. For example, embodiments of the client interface subsystems 410 are configured to interface with one or more of the client subsystems 140, physically and/or logically.

In some embodiments, the client interface subsystems 410 of the base station system 110 include physical features for mounting one or both of the tablet system 120 and the handset system 130. For example, the client interface subsystems 410 include the tablet interface region 125 and handset interface region 135, configured to physically receive a portion of the tablet system 120 and handset system 130, respectively. In one embodiment, the physical receiving is used to provide docking functionality for one or more client subsystems 140.

In other embodiments, the client interface subsystems 410 include mounting features designed to removably couple the base station system 110 with the tablet system 120, for example, so that the otherwise portable tablet system 120 remains in place for certain uses. As one example, the tablet system 120 includes a touch screen for use in typing, drawing, dragging, and/or other types of user interactivity. Using the base station system 110 to secure the tablet system 120 while typing, etc. may improve the user experience.

In still other embodiments, the client interface subsystems 410 include feature that configure the base station system 110 as a special-purpose mount for interfacing the tablet system 120 and/or the handset system 130 with a fixture or other element. For example, embodiments of the base station system 110 may provide under-cabinet mounting functionality for use in a kitchen, so that the tablet system 120 can be swung down from under the kitchen cabinets when in use and swung out of the way otherwise.

In even other embodiments, the client interface subsystems 410 provide support for functionality of other components. For example, charging functionality of the charging subsystem 420 and/or communications functionality of the communications subsystem 440 may be implemented in part through features of the client interface subsystems 410.

Embodiments of the base station system 110 include the charging subsystem 420, configured to provide charging functionality for charging one or more client subsystems 140 or their associated devices (e.g., the tablet system 120 and/or the handset system 130 of FIG. 1A). In certain embodiments, the charging is contactless (e.g., by induction). In certain other embodiments, the charging functionality is provided by physical ports and/or cables configured to interface with cables and/or ports on the respective devices (e.g., the tablet system 120, handset system 130, etc.). These charging functions may use features of the client interface subsystems 410.

For example, in one embodiment, a handset system 130 in which one client subsystem 140b is implemented includes two conductive contacts and a magnetic element in proximity to the bottom of its chassis. The corresponding client interface subsystem 410b of the base station system 110 similarly includes two conductive contacts and a magnetic element as part of the handset interface region 135. When the handset system 130 is coupled with the base station system 110, the magnetic elements hold the handset system 130 in place while the conductive contacts facilitate the flow of charging current to the handset system 130, as managed by the charging subsystem 420. In some embodiments, the charging functionality of the charging subsystem 420 is enhanced in one or more ways. For example, the base station system 110 may provide functionality for charge monitoring, error detection, battery failure, quick charging, etc.

Of course, embodiments of the charging subsystem 420 may require a source of power from which to provide charging current. In some embodiments, the charging subsystem 420 is coupled with the power subsystem 430. Some embodiments of the power subsystem 430 may simply provide an interface between the base station system 110 and a power source (e.g., a wall outlet). Other embodiments of the power subsystem 430 include additional functionality. For example, the power subsystem 430 may process (e.g., clean, convert, regulate, step up or step down, etc.) the input power, monitor and/or regulate power consumption of the base station system 110 and/or other devices, provide different levels for different functions (e.g., provide constant output current to the charging subsystem 420, low-voltage output to internal circuitry of the base station system 110, regulated power to a cooling fan, etc.), etc.

As described above, some embodiments of the base station system 110 include the communications subsystem 440 for providing certain communications functionality. In various embodiments, the base station system 110 is configured (using functionality of the communications subsystem 440) to act as a wireless fidelity (Wi-Fi) hotspot, a wireless repeater, a network hub, a network router (e.g., with or without network address translation (NAT) functionality), a picocell or femtocell, etc. For example, as shown, the communications subsystem 440 may include the network interface region 115 for interfacing with the network access system 150.

In one embodiment, the network interface region 115 includes a physical port for plugging into a network (e.g., an Ethernet port). In another embodiment, the network interface region 115 includes an unwired (e.g., wireless, cellular, etc.) receiver for interfacing with a local network via the network access system 150. The network interface region 115 may also include one or more logical ports, antennae, and/or any other useful network interface component. In certain embodiments, the network access system 150 is implemented within a chassis of the base station system 110, such that connections with the network access system 150 are internal to the base station system 110, and may or may not include physical connections (e.g., the connections may be logical or functional connections between functional components or modules).

Certain embodiments of the communications subsystem 440 provide interactive communications functionality (e.g., from other devices, the user network, the provider network, and/or other networks) to the client subsystems 140. For example, the communications subsystem 440 may be coupled with the client interface subsystems 410 such that communications services may be provided via the tablet interface region 125 and the handset interface region 135. Alternately, the communications subsystem 440 may include additional transceivers, logical ports, etc. For example, embodiments of the communications subsystem 440 may include Bluetooth communications components, USB hubs, radio antennae, etc.

In various embodiments of the base station system 110, functionality of the various functional blocks is supported by one or more of the processing subsystem 450 and the storage subsystem 460. For example, embodiments of the processing subsystem 450 include a central processing unit and/or dedicated processors (e.g., communications processors, graphics processors, etc.). Embodiments of the storage subsystem 460 may include a hard disk drive, a flash drive, a micro server, a data processing engine, and/or any other useful storage and/or data management components.

It will be appreciated that various embodiments of the base station system 110 may include only some of the functional blocks shown in FIG. 4 and, accordingly, only some of the functionality described above. Further, in some embodiments, the functionality of the base station system 110 is integrated into a single chassis. In other embodiments, certain functionality may be offloaded to peripheral devices (e.g., a USB storage drive as part of the storage subsystem 460, or an external signal booster as part of the communications subsystem 440) or distributed among multiple components. In still other embodiments, the chassis of the base station system 110 includes additional or alternate features. For example, the chassis may include various device interfaces (e.g., recesses, locks, ports, plugs, etc.), controls (e.g., buttons, switches, etc.), physical features (e.g., cooling fins, rubberized feet, etc.), etc.

Figure 5:
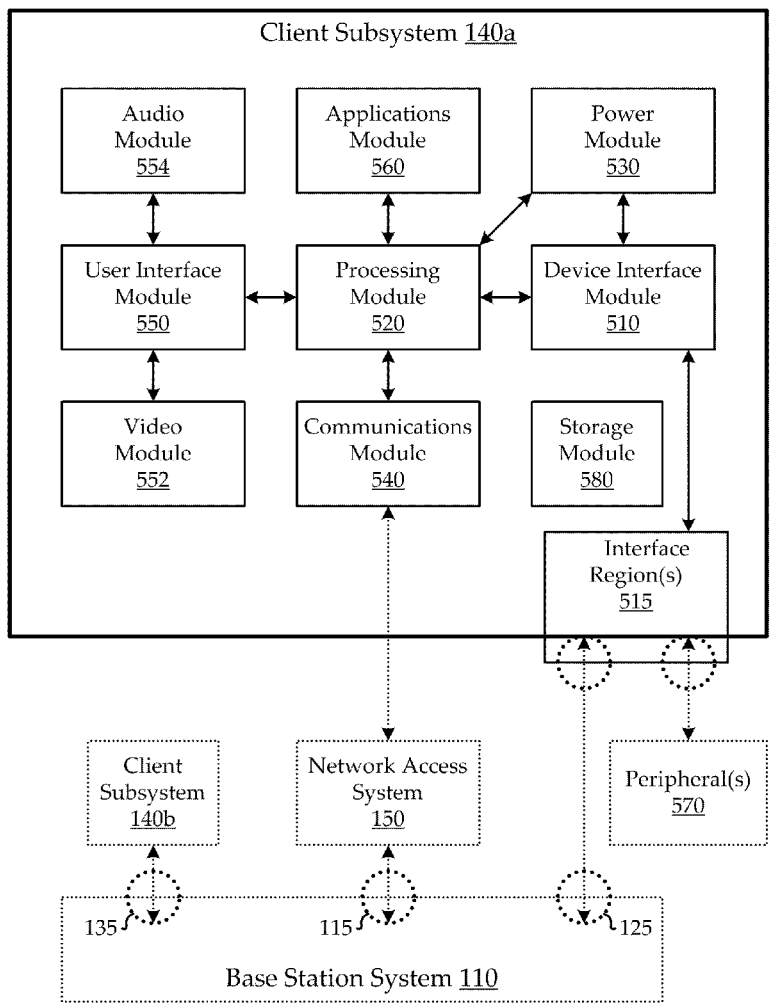
FIG. 5 shows a functional block diagram of a client subsystem in the context of certain other devices and systems, according to various embodiments.

It will be further appreciated that much of the functionality described above with reference to the base station system 110, and additional functionality of embodiments of user supersystems 100, may be implemented by the client subsystems 140. FIG. 5 shows a functional block diagram of a client subsystem 140a in the context of certain other devices and systems, according to various embodiments. For example, embodiments of the client subsystem 140a may be implemented substantially as described with reference to FIG. 1A. For the sake of clarity and to add context to the description, the client subsystem 140a is shown in communication with a network access system 150, a base station system 110 and one or more peripheral devices 570. The base station system 110 is shown in communication with the client subsystem 140a, another client subsystem 140b, and the network access system 150, via a tablet interface region 125, a handset interface region 135, and a network interface region 115, respectively.

It will be appreciated from the descriptions above that many other arrangements are possible according to other embodiments. As such, the context should not be construed as limiting the scope of the embodiments. For example, while the description will focus on client subsystem 140*a*, the same or different functional blocks may be included in client subsystem 140*b*. Notably, the client subsystem 140*a* is intended to broadly show illustrative functionality of a client subsystem 140, whether part of a dedicated device system (e.g., like the tablet system 120 or the handset system 130 of FIG. 1A), part of an undedicated device system (e.g., like the tablet system 120 or the handset system 130 of FIG. 1C), etc.

Embodiments of the client subsystem 140*a* may implement various functionality through functional blocks. As illustrated, the functional blocks may include a device interface module 510, one or more interface regions 515, a processing module 520, a power module 530, a communications module 540, a user interface module 550, a video module 552, an audio module 554, an applications module 560, and a storage module 580. As described above, embodiments of the client subsystem 140*a* may be incorporated within a device chassis.

Embodiments of the device interface module 510 are configured to provide an interface between the client subsystem 140 (e.g., or its respective device chassis) and either the base station system 110, a peripheral device 570, or some other device or component. For example, embodiments of the device interface module 510 may functionally correspond to embodiments of a client interface subsystem 410 of a base station system 110, as described with reference to FIG. 4.

In some embodiments, the device interface module 510 may be coupled with interface regions 515 that provide physical and/or logical components or features to support certain types of interfaces. For example, the interface regions 515 may include metal contacts (e.g., to facilitate charging from the base station system 110), a headphone or headset jack (e.g., for audio input/output), various internal ports or slots (e.g., for a battery, a memory card, a Subscriber Identity Module (SIM) card, etc.), etc. In one embodiment, the interface regions 515 include features for interfacing directly with the base station system 110 (e.g., via the tablet interface region 125 or the handset interface region 135). In another embodiment, the interface regions 515 include features for interfacing between the client subsystem 140*a* and another client subsystem 140 (e.g., between a handset system 130 and a tablet system 120). In yet another embodiment, the interface regions 515 are configured to support functionality of the communications module 540, as described more below.

Embodiments of the client subsystem 140*a* include a processing module 520. The processing module 520 may include a central processor, a graphics processor, an audio processor, and/or any other useful dedicated or multi-purpose processing components. For example, embodiments of the processing module 520 are designed to support functionality of other functional modules of the client subsystem 140*a*.

In some embodiments, the client subsystem 140*a* includes a power module 530. Embodiments of the power module 530 may deliver power to other functional modules, manage power consumption, process (e.g., clean, regulate, etc.) power, etc. Other functionality of the power module 530 may be appreciated in the context of other types of functionality. For example, if an external active device is being used, the device may draw power from the client subsystem 140*a*, and that power delivery may be controlled by the power module 530. In another example, during a charging or discharging cycle of a battery, the power module 530 may control and/or monitor charging or discharging current.

Other embodiments of the client subsystem 140*a* include a communications module 540. Embodiments of the communications module 540 provide various types of communications functionality. For example, as illustrated, the communications module 540 may handle communications with the base station system 110 and/or the network access system 150. In some embodiments, the communications module 540 performs a number of client-side functions, such as handling of requests, messaging, communications sessions, proxy functions, etc. In certain embodiments, the communications module 540 uses functionality of the device interface module 510 and/or other functional modules, for example, to manage certain types of communication flows with certain types of other devices or systems (e.g., for protocol management, demodulation, etc.).

Still other embodiments of the client subsystem 140*a* include a user interface module 550. In some embodiments, the user interface module 550 handles inputs and outputs through the video module 552, the audio module 554, and/or the peripheral devices 570. For example, embodiments of the video module 552 include a camera and a display. The display may be active or passive; responsive to touch by a finger, stylus, or other implement; responsive to remote interactions, etc.

Embodiments of the camera include a digital video camera integrated within the chassis of the client subsystem 140*a*, such that it can be pointed in various directions. In one embodiment, the camera swivels to point either in a direction substantially normal to the display (e.g., typically toward the primary user of the tablet system 120) or in an opposite direction (e.g., typically away from the primary user of the tablet system 120). Video captured by the camera may also be displayed substantially in real time on the display. The camera may also be configured to take still images.

Embodiments of the audio module 554 may include audio input components (e.g., microphones) and audio output devices (e.g., speakers). Input and/or output functionality of the user interface module 550 may be further implemented through peripheral devices, such as peripheral cameras, keyboards, printers, scanners, sensors, etc. In certain embodiments, the client subsystem 140*a* is configured to interface with one or more input/output devices via the base station system 110. For example, the base station system 110 may include a USB hub or a Bluetooth receiver, by which the client subsystem 140*a* interfaces with a compatible keyboard. Other interactivity may also be provided by voice capture (e.g., audio-to-text translation, direct voice recording, etc.) through the audio module 554, by motion capture (e.g., gestures, etc.) through the video module 552, and/or in any other useful way.

It will be appreciated that much of the functionality of the various modules described above may be designed substantially to support delivery of certain applications to a user of the client subsystem 140*a*. Embodiments of the client subsystem 140*a* include an applications module 560 for handling applications through the client subsystem 140*a*. In various embodiments, the applications module 560 uses functionality of other modules, such as the user interface module 550, the processing module 520, and the communications module 540 to implement applications functions.

Applications delivery by the applications module 560 and/or other types of functionality of the client subsystem 140*a* may be further supported by local storage through the storage module 580. Embodiments of the storage module 580 may include disk drives, flash drives, and/or other data storage and processing components. In certain embodiments, the storage module 580 is configured to integrate functionally with external storage, for example, in the base station system 110 or in the "cloud" (e.g., offered via the Internet, the provider network, etc.).

It will be appreciated that, while many embodiments are described above with reference to a user supersystem 100 having two client subsystems 140 (e.g., in a tablet system 120 and a handheld system 130), other configurations and topologies are possible. In some embodiments, the user supersystem 100 includes one tablet system 120 and multiple handheld systems 130, for example, used throughout a home. In other embodiments, multiple tablet systems 120 are used as part of the user supersystem 100. In still other embodiments, other devices (e.g., in the home) include some or all of the functionality of the client subsystem 140 for operation as part of the user supersystem 100. For example, a client subsystem 140 may be implemented as part of an alarm clock, weather station, television set-top box, laptop computer, etc.

It will further be appreciated that various embodiments of client subsystems 140 may include only some of the functional blocks (or additional functional blocks to those) shown in FIG. 5. Accordingly, other embodiments may include only some of the functionality described above or different functionality from that described above. Further, it will be appreciated that some or all of the functionality of the client subsystems 140, and also some or all of the functionality of the base station system 110, may be implemented by a computational system. For example, dedicated and/or multi-purpose hardware and/or software may be used to implement many of the functions described with reference to FIGS. 4 and 5.

Figure 6:
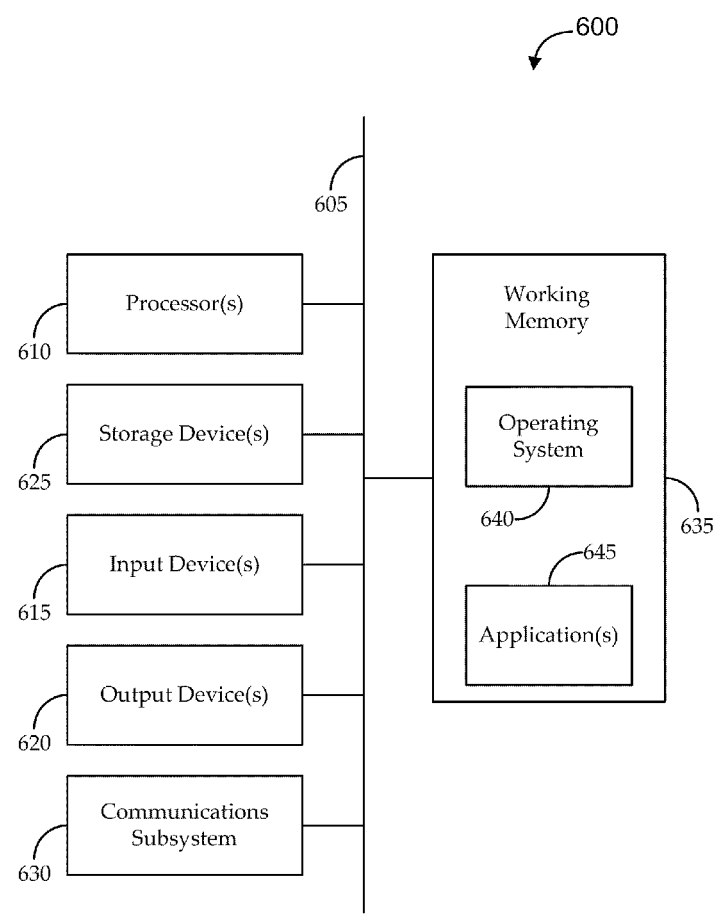
FIG. 6 shows a simplified block diagram of an illustrative computational system for use in implementing components of various embodiments.

FIG. 6 shows a simplified block diagram of an illustrative computational system 600 for use in implementing components of various embodiments. For example, components of the computational system 800 may be used to implement functionality of the base station system 110 or the client subsystem 140 (e.g., or the associated tablet system 120 or handset system 130). It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computational system 600 is shown to include hardware elements that can be electrically coupled via a bus 605 (or may otherwise be in communication, as appropriate). The hardware elements can include one or more processors 610, including without limitation one or more general-purpose processors and/or one or more special-purpose processors (such as digital signal processing chips, graphics acceleration chips, and/or the like); one or more input devices 615, which can include without limitation a mouse, a keyboard and/or the like; and one or more output devices 620, which can include without limitation a display device, a printer and/or the like.

The computational system 600 may further include (and/or be in communication with) one or more storage devices 625, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 600 might also include a communications subsystem 630, which can include without limitation a modem, a network card (wireless or wired), an infrared communication device, a wireless communication device and/or chipset (such as a Bluetooth device, an 602.11 device, a WiFi device, a WiMax device, cellular communication facilities, etc.), and/or the like. The communications subsystem 630 may permit data to be exchanged with a network (such as the network described below, to name one example), and/or any other devices described herein. In many embodiments, the computational system 600 will further include a working memory 635, which can include a RAM or ROM device, as described above.

The computational system 600 also can include software elements, shown as being currently located within the working memory 635, including an operating system 640 and/or other code, such as one or more application programs 645, which may include computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 625 described above.

In some cases, the storage medium might be incorporated within the computational system 600 or in communication with the computational system 600. In other embodiments, the storage medium might be separate from a computational system 600 (e.g., a removable medium, such as a compact disc, etc.), and/or provided in an installation package, such that the storage medium can be used to program a general purpose computer with the instructions/code stored thereon. These instructions might take the form of executable code, which is executable by the computational system 600 and/or might take the form of source and/or installable code, which, upon compilation and/or installation on the computational system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs the computational system 600 to perform methods of the invention. According to a set of embodiments, some or all of the procedures of such methods are performed by the computational system 600 in response to processor 610 executing one or more sequences of one or more instructions (which might be incorporated into the operating system 640 and/or other code, such as an application program 645) contained in the working memory 635. Such instructions may be read into the working memory 635 from another machine-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer readable medium", as used herein, refer to any medium that participates in providing data that causes a machine to operate in a specific fashion. In an embodiment implemented using the computational system 600, various machine-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 625. Volatile media includes, without limitation, dynamic memory, such as the working memory 635. Transmission media includes coaxial cables, copper wire and fiber optics, including the wires that comprise the bus 605, as well as the various components of the communication subsystem 630 (and/or the media by which the communications subsystem 630 provides communication with other devices).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 600. The communications subsystem 630 (and/or components thereof) generally will receive the signals, and the bus 605 then might carry the signals (and/or the data, instructions, etc., carried by the signals) to the working memory 635, from which the processor(s) 610 retrieves and executes the instructions. The instructions received by the working memory 635 may optionally be stored on a storage device 625 either before or after execution by the processor(s) 610.

Video Call Handling Embodiments

It will be appreciated from the above description that the systems, devices, and methods described above may be used to facilitate many different types of functionality. One type of functionality involves using the user supersystem 100 as a communications hub for facilitating video calling functionality. Embodiments include functionality for handling single- and multi-client video calling (e.g., using the tablet system 120 and/or the handset system 130), including handling hand-offs between multiple clients.

For example, the tablet system 120 may be used as a graphical communications hub in a family's home, used by the family to communicate with various parties using different types of communications modes. As discussed above, embodiments of the user supersystem 100 include a tablet system 120 and a handset system 130, both having an integrated display and an integrated camera. These integrated video input/output devices may be used to facilitate various types of enhanced communications functions, including enhanced video call handling.

Figure 7:
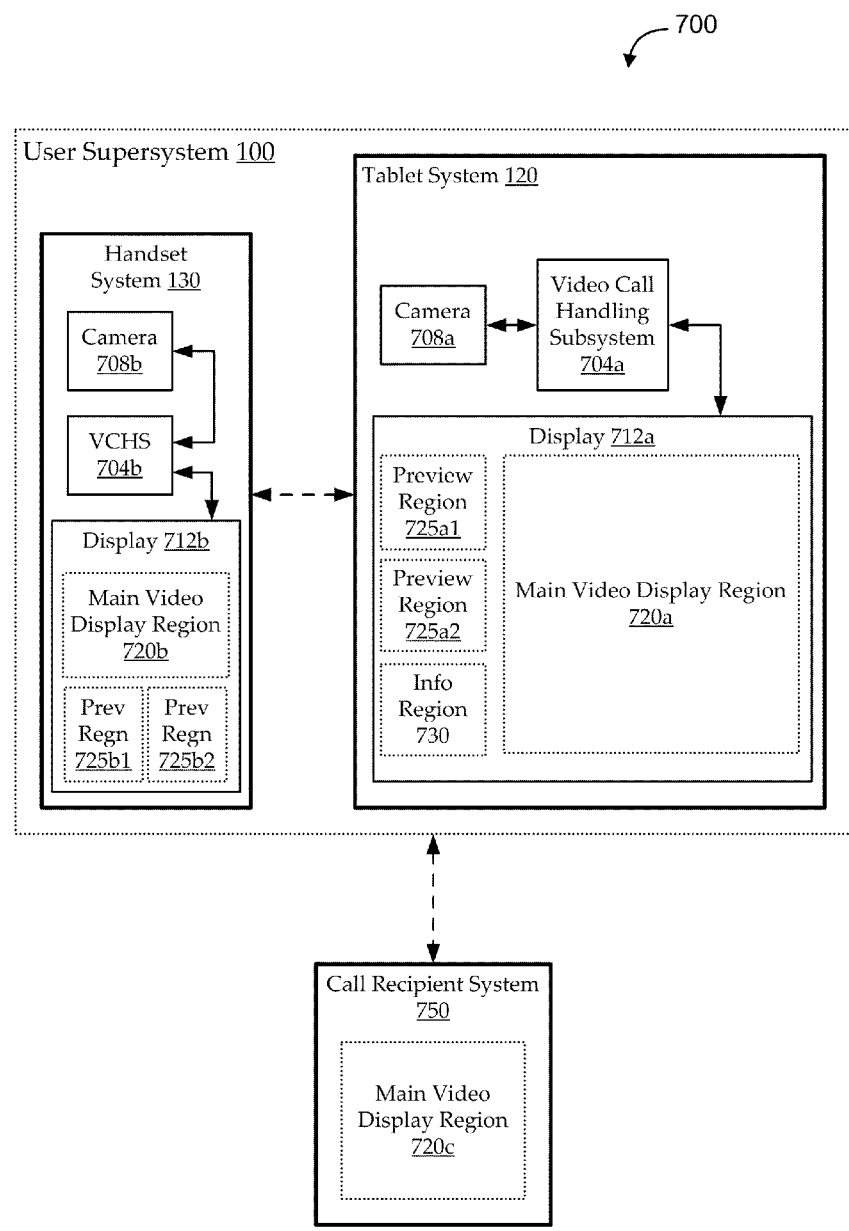
FIG. 7 illustrates a block diagram of a communications system, in accordance with various embodiments.

Turning first to FIG. 7, a block diagram of a communications system 700 is shown, according to various embodiments. The communications system 700 includes a user supersystem 100 in communication with a call recipient system 750, where the user supersystem 100 includes a tablet system 120 and a handset system 130. At least one of the tablet system 120 and the handset system 130 includes an integrated camera 708 and an integrated display 712, controlled at least partially by a video call handling subsystem 704. The call recipient system 750 may be any type of device or system capable of participating in a video communications session, and may or may not be able to contribute video of its own.

For the sake of clarity, the descriptions herein assume that the tablet system 120, the handset system 130, and the call recipient system 750 each has an integrated camera 708 and an integrated display 712. For example, a user of the user supersystem 100 calls a user of the call recipient system 750 via the tablet system 120. Sometime during the call, the handset system 130 joins. One or more video feeds may be displayed on the various systems.

In some embodiments, main video display regions 720 are used on each device to display the party at the other end of the line. For example, the user of the tablet system 120 may see video of the user of the call recipient system 750 in the tablet system's 120 main video display region 720. As described more fully below, the user of the call recipient system 750 may see the video feed from whichever user supersystem 100 integrated camera 408 is currently controlling the outgoing feed.

Certain embodiments of the integrated displays 712 on the tablet system 120 and/or on the handset system 130 may also include preview regions 725. In some embodiments, the preview regions 725 display secondary video feeds. For example, the user of the tablet system 120 may see (on the integrated display 712a) the incoming video feed from the call recipient system 750 in the main video display region 720a and the outgoing video feed from the integrated camera 708 of a component of the user supersystem 100 in one of the preview regions 725a. In another example, the user of the handset system 130 may see (on the integrated display 712b) the incoming video feed from the call recipient system 750 in the main video display region 720b, the outgoing video feed from the tablets system's 120 integrated camera 708a in one of the preview regions 725b1, and a preview of the video coming from the handset system's 130 integrated camera 708b (i.e., not currently being transmitted as part of the video call) in another one of the preview regions 725b2.

In other embodiments, the preview regions 725 indicate status of other clients. In one example, the handset system 130 joins a call between the tablet system 120 and the call recipient system 750, but has its integrated camera 708b turned OFF (e.g., completely off, not transmitting, etc.). One of the preview regions 725a of the tablet system 120 is used to indicate that another client is "on the line." For example, the second preview region 725a2 is displayed as a gray box (e.g., generically indicating that some other client device is on the line), with text or an icon indicating which client is participating in the call, etc.

In another example, the handset system 130 joins a call between the tablet system 120 and the call recipient system 750, and turns its integrated camera 708b ON (e.g., active and transmitting). The first preview region 725a1 of the tablet system 120 may show the video feed coming from the handset system 130 as the currently outgoing video stream, and the second preview region 725a2 of the tablet system 120 may show a preview of the video being taken by the tablet system's 120 integrated camera 708a. After some time, the integrated camera 708b is turned OFF (e.g., switched to not transmitting). The first preview region 725a1 of the tablet system 120 may now continue to show a last-captured frame of the video feed from the handset system 130 (e.g., darkened, or with some other indication that the video feed is currently inactive), and the second preview region 725a2 may continue to show a preview of the video being taken by the tablet system's 120 integrated camera 708a. The integrated camera 708a of the tablet system 120 may then be turned ON. The preview regions 725a may switch locations (e.g., the inactive handset system 130 feed may move to the second preview region 725a2 and the now-active tablet system 120 feed may move to the first preview region 725a1) to indicate that the tablet system 120 video feed is now being transmitted as the active outgoing video stream for the video call.

Of course, the preview regions 725 may be used to provide other types of functionality. For example, where there are multiple clients participating in a video call, one or more preview regions 725 may be used to show indications of client status, video feed previews, currently active and/or inactive feeds, etc. In certain embodiments, techniques are used to simultaneously transmit and/or receive multiple video feeds. For example, video feeds may be rendered as a combined video scene (e.g., rendered and/or sent as picture-in-picture or split screen), multiplexed, etc.

Embodiments of the integrated displays 712 on the tablet system 120 and/or on the handset system 130 may also include information regions 730. In various embodiments, the information regions 730 may show information about the party on the other end of the line (e.g., called contact showed to the caller, caller ID showed to the receiver, etc.), time on the call, current time and date, etc.

Additional functionality may be provided according to other embodiments. In some embodiments, one or more of the display regions (e.g., the main video display region 720 and/or the preview regions 725) can be resized (e.g., minimized, maximized, enlarged, shrunk, etc.), moved, rotated, etc. This may, for example, allow other functionality to be provided and/or interacted with while the video call is occurring. In other embodiments, other applications are integrated with the video call.

For example, during a video call from the tablet system 120 user to the call recipient system 750 user, the tablet system 120 user shrinks her main video display region 720 and accesses her photo album. By dragging the photo album application into one of the preview regions 725, she is able to share the photo album (e.g., or the entire active display) as the currently active outgoing video feed. Individual photos may then be pushed to, or pulled by, the call recipient system 750 user (e.g., through simple drag-and-drop, soft control, or other techniques) to call recipient system 750 storage (e.g., via an MMS message).

Figure 8:
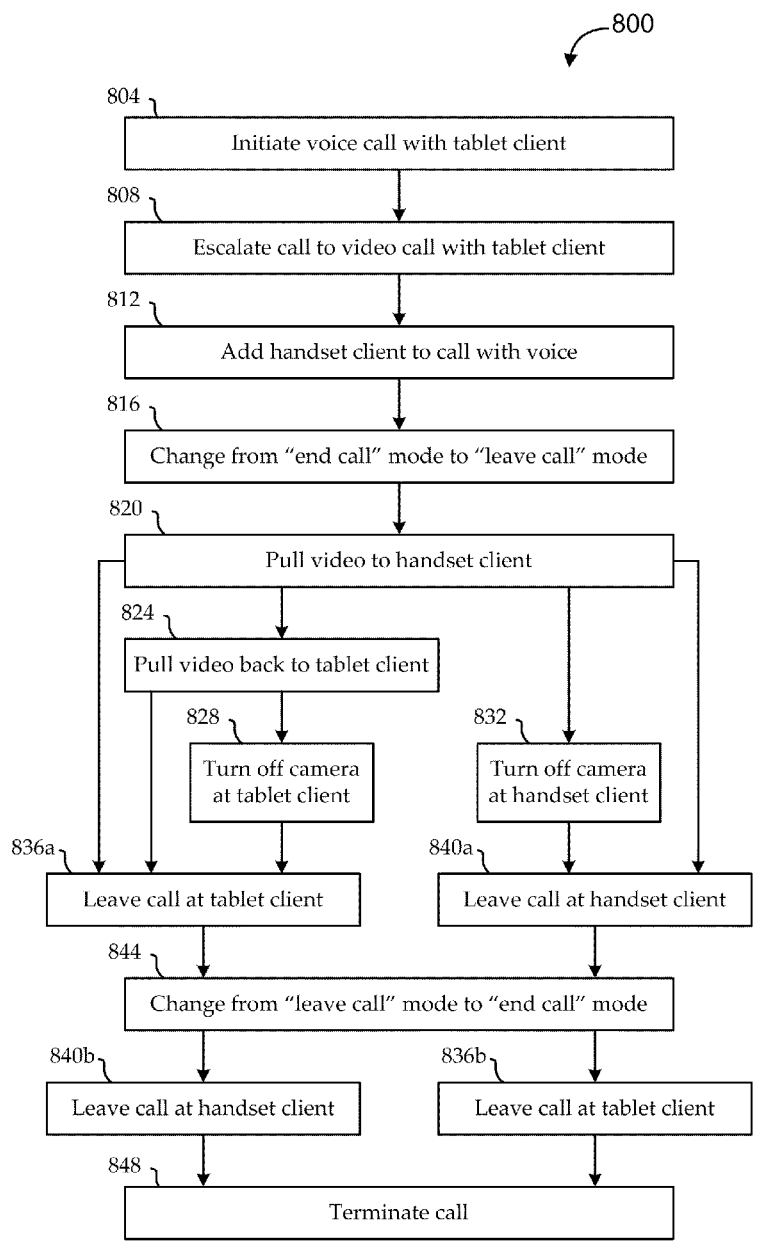
FIG. 8, illustrates a flow diagram of an exemplary method for providing video call handling functionality, according to various embodiments.

To further illustrate some of the functionality of various embodiments, FIGS. 8-18 show various methods followed by illustrative screenshots. Turning to FIG. 8, a flow diagram is shown of an illustrative method 800 for providing video call handling functionality, according to various embodiments. The method 800 begins at block 804 when a voice call is initiated with the tablet system 120 (e.g., the client subsystem 140 of the tablet system 120). Notably, while a certain sequence of events is presented in the context of the method 800, this sequence of events is intended only to illustrated functionality, and not to limit the scope of the invention. For example, in other embodiments, it may be possible to initiate the call using the handset system 130.

At block 808, video may be added to the call, for example, by activating the integrated camera 708a of the tablet system 120. It is worth noting that the method 800 is described with the call being initiated at block 804 as a voice call, which is escalated to a video call at block 808. While some embodiments allow initiation of the call as a video call, a voice-foundation call architecture may be desirable for various reasons. For example, the voice call may be handled as a voice-over-Internet-Protocol (VoIP) session. One or more video feeds, one or more additional clients, etc. may then be layered on top of (e.g., and/or associated with) the base VoIP session (e.g., using the session management system 376 of the provider network 160, as described with reference to FIG. 3).

Figure 9:
FIGS. 9-18 are exemplary screen shots showing examples of user interfaces that may be presented to a user, in accordance with various embodiments.
Figure 10:
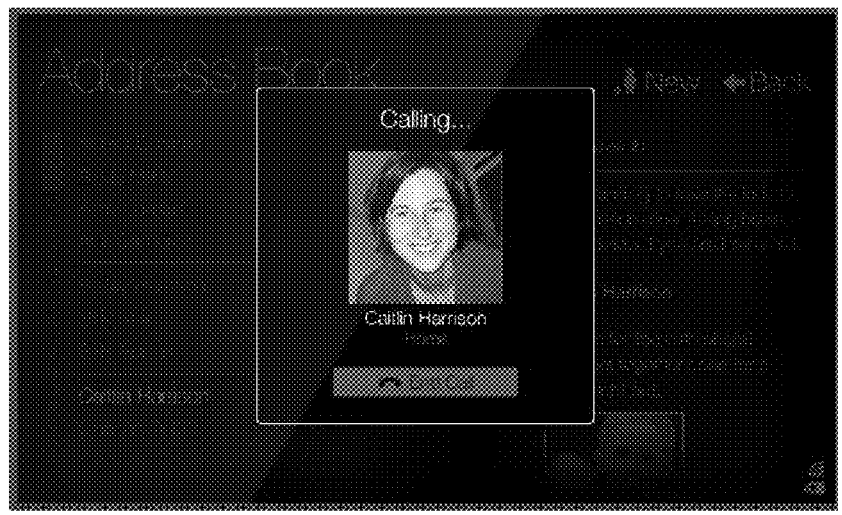

For the sake of illustration, FIG. 9 shows an illustrative screenshot of an address book page through which a call may be initiated via an embodiment of a tablet system 120. In the illustrative example, Mom (e.g., a member of a family that uses the user supersystem 100 as a home communications hub) calls a contact, Caitlin Harrison, at Caitlin's home number, using a speed dial control on Caitlin's contact page. A "calling . . . " frame may appear, as shown in the illustrative screenshot of FIG. 10.

Figure 11:
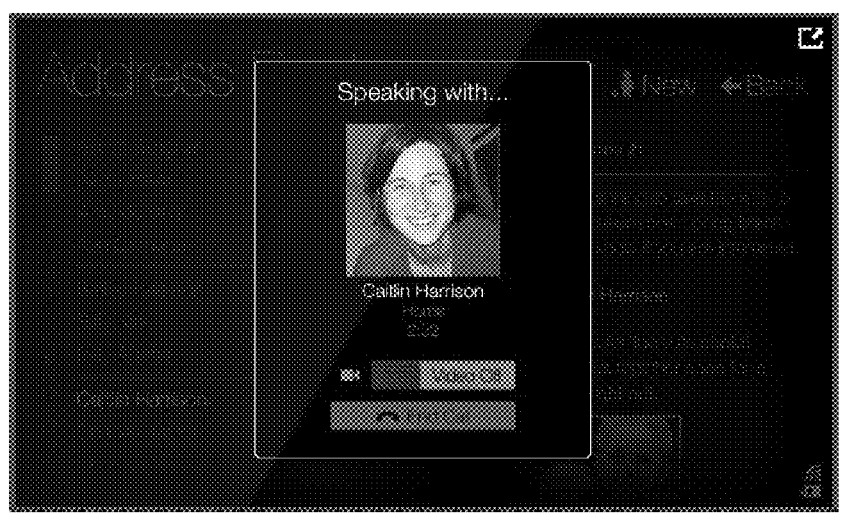

When the voice call is initiated (e.g., at block 804 of the method 800 of FIG. 8), the frame display may change to show an active voice call, as shown in the illustrative screen shot of FIG. 11. The active call frame may include various useful information and controls for use during the call. For example, the frame may display the contact name, which contact number was dialed, an image associated with the contact, elapsed call time, etc. In some embodiments, the frame includes an "End Call" control (e.g., a soft (virtual) button). As described more fully below, selecting this control may terminate the call session, for example, because the tablet system 120 is the only client of the user supersystem 100 currently participating in the call.

Embodiments of the call display include one or more video controls. For example, as shown in FIG. 11, a virtual rocker switch may be provided for use in toggling the video feed between active and inactive status. Notably, in various embodiments, turning the camera "ON" and "OFF" may be implemented in different ways. For example, in one embodiment, the camera may be enabled or disabled; while in another embodiment, the camera is always enabled, but the video feed may only be transmitted as part of the video call when the camera is designated as "ON."

Switching the camera to ON may, therefore, add video to the call (e.g., according to block 808 of the method 800 of FIG. 8. In some embodiments, the display may change to look similar to the illustrative screenshot shown in the tablet system 120 embodiment of FIG. 12. As described above with reference to FIG. 7, the tablet system 120 display may include a main video display region 720, preview regions 725, and information regions 730. The main video display region 720 is illustrated as showing the incoming video feed of Caitlin Harrison and her daughter (e.g., via their call recipient system 750). One preview region 725 is active and is illustrated as showing the outgoing video feed of Mom (e.g., via the camera 708a of the tablet system 120, which is presumably what is being displayed to the call recipient system 750 display). Notably, the information regions 730 include information about the call and various controls, such as the virtual rocker switch for toggling the video feed status and the "End Call" control.

Other video controls are possible as well, depending on the nature of the device participating in the call. For example, as noted above, some handsets (and/or tablets) might have multiple cameras, such as a front-facing camera (which faces the user during normal operation and/or faces the same direction as the device's display, e.g., to provide video/images of the user while the user is using the device) and a rear-facing camera (which faces away from the user during normal operation and/or faces the opposite direction as the display), e.g., to provide video/images of a scene the user is viewing). Certain embodiments, therefore, can provide the user with a control (e.g., a soft button) to specify which camera should be active at a given time.

By manipulating that control, the user can control which camera is active and/or which camera provides a video feed for the video call. In this way, for example, the user can elect to allow the other call participant(s) to see the user or to see what the user is looking at (or is aiming the camera at), while still allowing the user to see incoming video on the device's display screen. In an aspect, this control may be available during a video call (or whenever one of the cameras is otherwise active), to allow the user to switch cameras during the call.

The orientation of the device itself might serve as a video control. For example, if the device is oriented in an upright position, the device may be configured to capture video/images with a portrait format and/or a first aspect ratio, and/or to display the display regions, controls, etc. in a portrait orientation and/or a first aspect ratio. Conversely, if the device is rotated sideways, the device may be configured to capture video/images (and/or to display the display regions, controls, etc.) in a landscape format and/or a second aspect ratio. In this way, the orientation of the device might dictate the orientation and/or aspect ratio of the incoming video displayed in the primary display area (as well as video and/or items displayed in other display areas); the incoming video might be cropped and/or otherwise resized as appropriate to fit the new orientation/aspect ratio. Other possibilities exist within the scope of various embodiments.

Figure 12:

As described above, some functionality of the user supersystem 100 involves interactions between its various clients, for example, between the tablet system 120 and the handset system 130. As illustrated in FIG. 12, even though the handset system 130 is currently not participating in the call (e.g., the handset system 130 is docked at the base station system 110, has not been activated, etc.), the ongoing call with Caitlin Harrison may be indicated on the display of the handset system 130.

Returning to FIG. 8, at block 812, another client (e.g., the handset system 130) may join the call, and the client may be added to one or more portions of the session (e.g., voice, incoming video, outgoing video, etc.). In some embodiments, the "End Call" control changes to a "Leave Call" control at the tablet system 120 (e.g., and at the handset system 130). For example, in a traditional POTS phone call, the circuit remains open while any phone participating in the call remains "off the hook." In many typical VoIP and similar types of call sessions, one or more clients participating in the session can terminate the session, and the session ends. According to some embodiments, the session is configured to operate more like a traditional circuit-based phone call, such that the virtual circuit (e.g., VoIP session) remains open until all parties leave the call. As such, selecting the "Leave Call" control will not end the session; rather, the device or system from which the control is selected may leave the call and the session may continue with remaining devices.

Figure 13:

For example, FIG. 13 shows an embodiment of a tablet system 120 and a handset system 130 with respective illustrative screen displays. For example, the displays may correspond to block 816 of the method 800 of FIG. 8, at which point the handset system 130 has joined the call, but has not activated its video feed. Looking first at the handset system 130 display, the incoming feed is shown in the main video display region 720b and the outgoing feed (e.g. from the tablet system 120 camera 708a) is shown in one of the preview regions 725b. The virtual rocker switch indicates that the video feed from the handset system 130 is not active in the video call. In some embodiments, a second preview region 725b may be used to show a preview of the video being taken by the camera 708b of the handset system 130.

Turning to the illustrative tablet system 120 shown in FIG. 13, the incoming feed is shown in the main video display region 720a and the outgoing feed is shown in a first preview region 725a1. The virtual rocker switch indicates that the video feed from the tablet system 120 is active as an outgoing feed in the video call. The second preview region 725a2 is shown as a gray box, generically indicating that another client (i.e., the handset system 130, in this embodiment) is "listening in" to the call. The tablet system 120 display also shows the "Leave Call" control. As discussed above, if Mom were to select the "Leave Call" control (e.g., "push" the virtual button), the tablet system 120 may leave the call, but the call may continue between handset system 130 and Caitlin Harrison's call recipient system 750.

Returning to FIG. 8, at block 820, the video feed is pulled to the handset system 130 client. Embodiments of the user supersystem 100 are designed for "opt-in only" video control hand-off. For example, certain embodiments may use techniques to push another client's camera on (e.g., when one party leaves a call, another active party's camera automatically turns on), to request and/or offer control (e.g., a client user can virtually request control, and the currently controlling client may accept or reject the change in control), etc.

However, it may be desirable to prevent cameras from being pushed on during normal modes of operation. For example, a user may not be ready for her local camera to become active, and may not want another user to be able to unexpectedly force her camera into an active state (e.g., actively or passively). As such, some typical embodiments of the user supersystem 100 are configured for asymmetric "opt-in only" functionality, whereby the video feed is pulled, rather than pushed. Notably, this may result is a virtual "tug-of-war" over control of the video feed. However, while technical solutions are available in some embodiments (e.g., by some of the techniques described above, by allowing for override capability, by assigning clients in a control hierarchy, etc.), typical embodiments contemplate that this issue is addressed in non-technical ways (e.g., as a function of family etiquette).

Figure 14:

For example, FIG. 14 shows an embodiment of a tablet system 120 and a handset system 130 with respective illustrative screen displays. For example, the displays may correspond to block 820 of the method 800 of FIG. 8, at which point the handset system 130 has activated its video feed. Looking first at the handset system 130 display, the incoming feed continues to show in the main video display region 720b and the outgoing feed (e.g. now coming from the handset system 130 camera 708b) shows in the preview region 725b. The virtual rocker switch indicates that the video feed from the handset system 130 is active in the video call. The illustrative tablet system 120 display looks similar to the one shown in FIG. 13, with the incoming feed shown in the main video display region 720*a*. However, in FIG. 14, the outgoing feed is shown in the second preview region 725*a*2, and the first preview region 725*a*1 shows a representation of the tablet system 120 video feed as currently inactive (e.g., a grayed-out representation of the last-displayed frame prior to shifting control to the handset system 130). The virtual rocker switch indicates that the video feed from the tablet system 120 is inactive. Notably, according to the "opt-in only" functionality, turning the handset camera 708*b* ON via the virtual rocker switch at the handset system 130 may automatically cause the tablet camera 708*a* to turn off and the virtual rocker switch at the tablet system 120 to automatically switch to the "Video OFF" position.

This "opt-in only" functionality, and other functionality, will be further appreciated through some of the scenarios described with reference to the remaining portions of the method 800 of FIG. 8. A number of scenarios are described by the remaining blocks of FIG. 8. It will be appreciated that many other scenarios are possible, and that these scenarios have been selected as illustrative of certain types of functionality.

Figure 15:

According to one scenario, the video (e.g., the outgoing video feed control) is pulled back to the tablet system 120 at block 824. For example, the virtual rocker switch on the tablet system 120 display is switched to the "Video ON" position, which may automatically cause the video feed from the handset system 130 to become inactive and the virtual rocker switch at the handset system 130 to automatically switch to the "Video OFF" position. This condition is illustrated by the embodiment of FIG. 15. The embodiment illustrated by FIG. 15 is effectively the same as the embodiment illustrated by FIG. 14, except that the indications of which outgoing video feed is active have changed on both the tablet system 120 and the handset system 130, and the virtual rocker switch positions are changed according to the change in video feed status.

At block 828, the tablet camera 708*a* is turned off (e.g., the virtual rocker switch is toggled). According to block 824, the tablet system 120 is in control of the outgoing video feed at the time the camera 708*a* is turned off in block 828. As described above with reference to the "opt-in only" functionality, embodiments may avoid automatically pushing the active outgoing video feed to a different client. In certain embodiments, this may manifest at the handset system 130 as having only an incoming video feed and no active outgoing video feed. Alternatively, the call may revert to a voice-only call when there is no active outgoing video feed.

At block 836*a*, the tablet system 120 client may leave the call (e.g., by the user of the tablet system 120 selecting the "Leave Call" control displayed at the tablet system 120). Notably, the functionality of block 836*a* may be substantially the same regardless of whether the video was pulled back to the tablet system 120 at block 824 and/or whether the tablet camera 708*a* was turned off at block 828 prior to block 836*a* (e.g., embodiments of the method may skip those blocks and proceed directly from block 820 to block 836*a*).

Figure 16:

For example, FIG. 16 shows another embodiment of the tablet system 120 and the handset system 130 with their respective illustrative screen displays after block 836*a* (e.g., after the tablet system 120 has left the call. From the perspective of the handset system 130 display, the incoming feed continues to show in the main video display region 720*b* and there is no outgoing feed. In the illustrative embodiment, the preview region 725*b* shows a gray box to indicate no active video feed. Other embodiments may indicate this condition in other ways, using different numbers of preview regions 725*b*, etc. Notably, the virtual rocker switch remains in the "Video OFF" position, as video feed control has not been pulled to the handset system 130.

In the embodiment illustrated, the tablet system 120 display reverts back to the pre-call condition (e.g., as shown in FIG. 9). Of course, other embodiments handle leaving the call in other ways. For example, a frame may remain to indicate the ongoing call with the handset (e.g., similar to the one shown as displayed on the handset system 130 in FIG. 12). Various embodiments use various display interface techniques to allow the tablet system 120 to re-join the ongoing call, to simultaneously make another call (e.g., on another "line," session, etc.), to view the call details (e.g., currently elapsed time of the ongoing call, parties involved, etc.), etc.

In some embodiments, the handset system 130 displays an "End Call"/"Leave Call" control. While the tablet system 120 was on the call, the control may have displayed "Leave Call." After the tablet system 120 leaves the call (e.g., assuming no other clients are on the call), at block 844, the control may change to an "End Call" control. Notably, even where the handset system 130 control is a hard control (e.g., a button integrated into the chassis, a button on an attached headset, etc.) or another type of control or icon, the functionality still may be altered accordingly to change from "Leave Call" to "End Call" functionality. At block 840*b*, the handset system 130 client (i.e., assumed to be the only remaining client participating in the call) leaves the call (e.g., by the user interacting with the "End Call" control). In response, the call (e.g., session) may terminate at block 848.

Returning to block 820 (where both the tablet system 120 and the handset system 130 are participating in the video call, and the video feed control is pulled to the handset system 130), further functionality may be illustrated by other scenarios. According to one such other scenario, at block 832, the handset camera 708*b* is turned off (e.g., the virtual rocker switch is toggled). As in block 828 (e.g., according to the "opt-in only" functionality), embodiments may avoid automatically pushing the active outgoing video feed to a different client. In certain embodiments, this may manifest as both the handset system 130 and the tablet system 120 showing only an incoming video feed and no active outgoing video feed. Alternatively, the call may revert to a voice-only call when there is no active outgoing video feed.

At block 840*a*, the handset system 130 client may leave the call (e.g., by the user of the handset system 130 selecting the "Leave Call" control displayed at the handset system 130). Notably, the functionality of block 840*a* may be substantially the same regardless of whether the handset camera 708*b* was turned off at block 832 prior to block 840*a* (e.g., embodiments of the method may skip block 832 and proceed directly from block 820 to block 840*a*). In some embodiments, the tablet system 120 and/or handset system 130 displays may revert to something like those illustrated in FIG. 12.

It may be assumed at this point that the tablet system 120 is the only client continuing to participate in the call. At block 844, as described above, the control may change to an "End Call" control (e.g., as in FIG. 12). At block 836*b*, the tablet system 120 client leaves the call (e.g., by the user interacting with the "End Call" control). In response, the call (e.g., session) may terminate at block 848.

Many other types of video call handling functionality are provided by embodiments, for example, exploiting the user supersystem 100 as a communications hub. For example, as described above, one or more applications may be integrated with the video call to allow media to be shared live, transmitted or received as files (e.g., via MMS), etc. One example of similar functionality is illustrated by FIGS. 17 and 18.

Figure 17:
Figure 18:
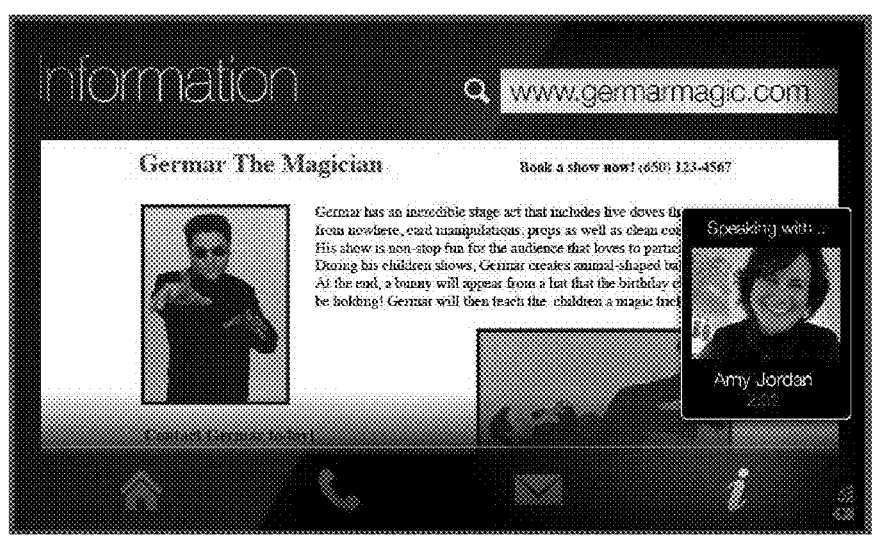

FIG. 17 shows an illustrative screenshot shown on an embodiment of a tablet system 120. The screenshot illustrates an ongoing video call between "Mom" and "Amy Jordan." Notably, the screenshot of FIG. 17 is similar to the screenshot described above with reference to FIG. 12. According to this example, Amy asks Mom for information on the magician that performed at Mom's daughter's birthday party. Using a "minimize" control in the corner of the main video display region 720, Mom minimizes the main video display region 720, as illustrated by the screenshot of FIG. 18. Mom may select navigational controls (e.g., shown at the bottom of the screenshot of FIG. 18), taking her to a web browser, from which she may navigate to the magician's website.

The website information may then be communicated to Amy in various ways according to various embodiments. In one embodiment, Mom simply reads the information to Amy, or separately sends the information (e.g., via a separate text message, email, etc.). In other embodiments, the communication is more integrated. For example, the user supersystem 100 may provide one or more controls to cause the website to be communicated automatically to Amy or to cause the browser to be visible as the outgoing video feed for the video call (e.g., or as picture-in-picture, split screen, etc.).

It is worth noting that embodiments of video call handling functionality are described above in relation to a user supersystem 100 having a single tablet system 120 and a single handset system 130 purely for the sake of clarity. In fact, it will be appreciated that similar, identical, or even further functionality is possible with multiple tablet systems 120 and/or handset systems 130. For example, multiple component systems (e.g., each having a client subsystem 140) may hand-off video among the systems using a combination of family etiquette and technological features, as described above.

As noted above, various embodiments can support a wide variety of communication technologies. Merely by way of example, a set of embodiments might employ packet-based transport between a household communication system (which might include a supersystem as described above, and/or might include any devices that are capable of providing packet-based communications, and in particular, packet-based voice communications, such as VoIP) and a provider network, which can serve as a gateway to other VoIP systems, POTS systems, and/or the like. Although VoIP (and other packet-based) communication systems can provide significant advantages over other types of voice transport, they sometimes have limitations as well.

Merely by way of example, while a VoIP system (e.g., a SIP-based system) can provide lower operating costs (both for providers and subscribers) as well as enhanced features (including without limitation video calling, as described above) that might be difficult to implement in a traditional POTS-based household telephony system, other features, many features, including some that subscribers may take for granted, are more difficult to provide in a VoIP-based system. One such feature is the conventional, "party-line" behavior of conventional, POTS-based telephones, in which different users might all pick up the telephone to hold a common conversation with an outside caller. In many cases, SIP-based VoIP systems have difficulty accommodating these scenarios, since each extension will seek to initiate a SIP session with a common gateway.

Figure 19:
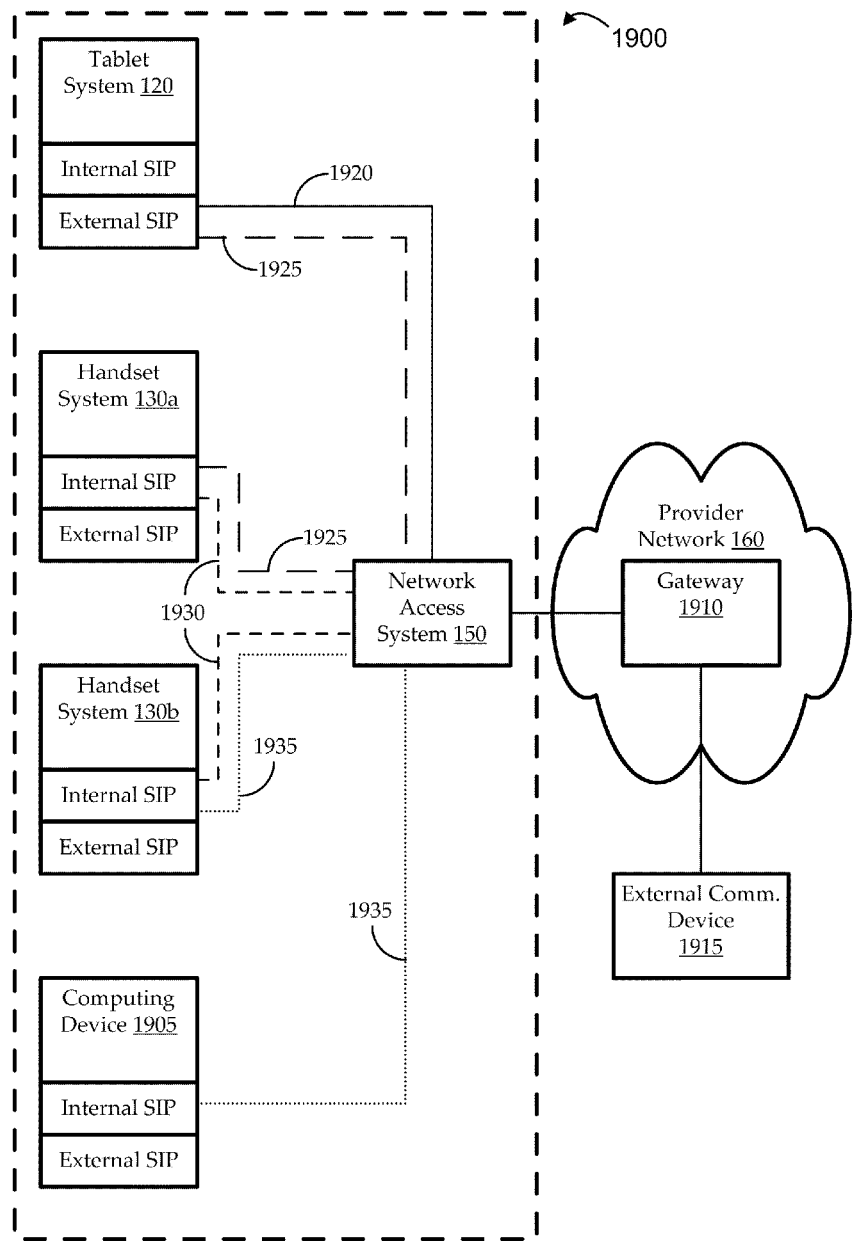
FIG. 19 illustrates a block diagram of a communications system, in accordance with various embodiments.

A set of embodiments, however, can avoid these problems, at least in part through a novel session initiation technique. FIG. 19 illustrates an exemplary system 1900 that allows such functionality (including without limitation party-line behavior). The system 1900 is illustrated in simplified format to highlight certain novel features. It should be appreciated that the system 1900 can be seen as a functional view of a system that might have any of several different architectures, including without limitation, systems described above (such as, merely by way of example, the systems described with respect to FIGS. 1A-1C and 7 above). The system 1900 can support a variety of SIP-based communication techniques, including without limitation voice calling and video calling, from a number of different devices, while allowing some or all of those devices, as desired, to participate in a common call with an external party (outside the communication system 1900).

The communication system 1900 can include a plurality of devices that are capable of participating in SIP sessions (e.g., VoIP voice calls, video calls, etc.), including, merely by way of example, one or more tablet systems 120, one or more handset systems 130 (e.g., as described above), and perhaps one or more other SIP-capable computing devices 1905, such as personal computers, laptops, smart phones, etc. In an aspect, each of these devices are Universal Plug'n'Play ("UPnP") capable, and each devices is configured to be aware of the status of any ongoing SIP-based call within the communication system 1900, including without limitation, the UPnP device name of each device participating in such a call at any given time. In an embodiment, for example, a server in the provider network 160, and/or the network access system 150, might be responsible for informing all devices of the UPnP names of the other devices within the system (or such information might be auto-discoverable on a peer-to-peer basis). Similarly, information about call activity might be distributed to the devices by the same server, and/or might be shared on a peer-to-peer basis.

The communication system 1900 might also include a network access system 150 (e.g., as described above), which is in communication with a provider network 160, and in particular, a gateway device 1910, which might serve as a VoIP/POTS gateway in some embodiments, but which, in a general sense, provides gateway services between the communication system 1900 and other systems, which might be operated by third parties and/or might employ any of a variety of voice/video communication techniques. Particularly, in the illustrated embodiment, the gateway device 1910 provides connectivity (e.g., via a PSTN, the Internet, etc.) with an external communication device 1915, which is separate from the communication system 1900. In some cases, the functionality of gateway device 1910 might be provided within the communication system 1900, e.g., as part of the network access system 150.

In an embodiment each of the computing devices (e.g., tablet(s) 120, handset(s) 130, and other computing devices 1905) will be capable of participating in an external SIP session, which is routed, e.g., though the network access system 150, to the gateway device 1910, which it is further routed (perhaps, e.g., as a POTS call) to the external communication device 1915. In a particular aspect, each of the computing devices might also be capable of simultaneously participating in an internal SIP session, which might be mediated and/or routed by the network access system 150, but does not traverse outside the communication system 1900. In this way, traffic (including VoIP traffic managed through internal SIP sessions) does not load the link between the network access system 150 and the provider network 160. Beneficially, this arrangement can provide party-line functionality without overloading the link (e.g., a DSL link) between the communication system 1900 and the provider network 160.

An example of this functionality is illustrated by FIG. 19, in which the tablet system 120 participates in VoIP call (which might be escalated to video, as described above) with the external communication device 1915, as shown by the solid line 1920 from the tablet 120, through the network access system 160 and gateway device 1910 (where the call might be converted to a circuit-switched POTS call) to the external communication device 1915. Although the call is illustrated as including the tablet 120 as the primary participating device (the "owner" of the call), any of the other computing devices 130, 1905 could instead serve as the primary participating device. In an aspect, whichever computing device 120, 130, 1905 first participates in the call serves as the owner of the call, although this designation can change during the course of the call, as described below.

If a user of another device (such as a handset 130a, which as noted above, will be aware of the ongoing call involving the tablet 120 as owner of the call) wishes to join the call, the user can provide user input to the other device (e.g., handset 130a), which, in an embodiment, will initiate an internal SIP session (shown by broken line 1925) with the owner of the call (in this case, the tablet 120), which will join ("bridge") the handset's SIP 1925 session with its own external SIP session 1925, allowing the handset 130a to participate as well.

Likewise, in an aspect, if a user of a third device (e.g., handset 130b) wishes to join the call, that device 130b will initiate another internal SIP session (shown by broken line 1930) with the second device on the call (in this case, handset 130a), which will bridge the two SIP sessions 1930 and 1925, allowing the third device 130b to participate. In similar fashion, another device (e.g., computing device 1905) can initiate its own SIP session (shown by broken line 1935) with the third device 130b, which will bridge its two SIP sessions 1935 and 1930. Alternatively, each of the additional devices 130a, 130b, 1905 might instead initiate their own internal SIP sessions with the owner of the call (e.g., tablet 120).

The daisy chain arrangement illustrated by FIG. 19, however, offers some advantages. For example, it provides flexibility in re-designating the owner of the call. In an aspect, for example, on a video call, the system 1900 might be configured to allow one of the devices to provide a video feed for reception by the external communication device 1915, and the device providing video might be designated as the owner of the call. Alternatively and/or additionally, if the user of the call owner wishes to leave the call, another device (e.g., the second device on the call, which, as illustrated, is the handset 130a) might be re-designated as owner of the call.

In some embodiments, if the call owner is re-designated, whichever device is designated as owner will initiate a new external SIP session with the gateway device 1910, which will terminate the SIP session with the previous owner. In an aspect, the gateway device 1910 maintains its connection (of whatever type) with the external communication device 1915, so the overall continuity of the call is not interrupted by the re-designation of the call owner within the communication system 1900.

Using the illustrated, daisy-chain arrangement, the other devices 130b, 1915 will not have to initiate new SIP sessions, although this can be accomplished if necessary and/or if a different topology is implemented. The original call owner (e.g., tablet 120), could, of course, re-join the call, e.g., by initiating a new internal SIP session with whatever device is at the end of the chain (and/or with the new call owner, depending on the chosen topology). In some cases, escalating a call from voice to video is accomplished in similar fashion (by re-establishing an external SIP session, with the device providing the video being designated the call owner), and de-escalating a call from video to voice can be accomplished in much the same way (e.g., by re-initiating a voice-only SIP session, perhaps without changing the call owner designation).

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added, and/or subtracted from among other described embodiments, unless the context dictates otherwise.

What is claimed is:

1. A communication system for facilitating enhanced communications, the system comprising:
   a first computing device, at a subscriber premises and in communication with a service provider network and a local network, the first computing device participating in an external original voice call for a user of the first computing device over an external session initiation protocol ("SIP") session, via the service provider network, with an external communication device outside the communication system; and
   a second computing device, at the subscriber premises and in communication at least with the local network, the second computing device is configured to join the external original voice call between the first computing device and the external communication device via an internal SIP session with the first computing device over the local network;
   wherein:

when the second computing device joins the particular external voice call, the first computing device, the second computing device, and the external communication device are participating in the external original voice call;

the first computing device is configured to provide communication connectivity between the second computing device and the external communication device by bridging the internal SIP session with the external SIP such that the first computing device, the second computing device, and the external communication device are all participating in the external original voice call;

the first computing device that provides communication connectivity between the second computing device and the external communication device leaves the voice call;

the second computing device automatically establishes a second external SIP session that is independent of and separate from the first external SIP session with the external communication device, such that the external original voice call continues between the second computing device and the external communication device, without continued participation of the first computing device that provided communication connectivity between the second computing device and the external communication device; and the first external SIP session between the first computing device and the external communication device terminates once the second external SIP session has been established between the second computing device and the external communication device.

2. The system of claim 1, wherein the first and second computing devices are part of a supersystem for providing interactive communications services within the local network, the supersystem comprising:

a tablet system, comprising a first client subsystem of the local network and a first user interface module configured to provide interactivity with first communications services provided by the first client subsystem;

a handset system, comprising a second client subsystem of the local network and a second user interface module configured to provide interactivity with second communications services provided by the second client subsystem; and a base station system, comprising:
a first interface subsystem configured to communicatively and removably couple the base station with the tablet system;
a second interface subsystem configured to communicatively and removably couple the base station with the handset system; and
a communications subsystem configured to communicatively couple the base station with the local area network such that at least a portion of the first and second communications services are provided via the base station.

3. The system of claim 2, wherein the communications subsystem provides communication connectivity between the first computing device and the service provider network.

4. The system of claim 2, wherein the tablet system comprises the first computing device.

5. The system of claim 2, wherein the handset system comprises the second computing device.

6. The system of claim 2, wherein the handset system is a first handset system comprising the first computing device, and wherein the system further comprises a second handset device comprising the second computing device.

7. The system of claim 1, wherein the external communication session comprises a video call.

8. The system of claim 7, wherein:
the first computing device comprises a first camera and a first display screen;
the second computing device comprises a second camera and a second display screen;
the first display screen comprises a primary display area and a second display area, the primary display area displaying video received from the external communication device.

9. The system of claim 8, wherein the secondary display area displays video captured by the second camera and transmitted from the second computing device to the first computing device over the internal connection.

10. The system of claim 7, wherein the first computing device is configured to transmit, over the external communication session, video captured by the first camera.

11. The system of claim 10, wherein the second computing device is configured to capture video with the second camera and request transmission of the captured video to the external communication device.

12. The system of claim 11, wherein:
the service provider network comprises a gateway device providing connectivity between the communication system and the external communication device, the external communication session comprising a communication session between the first computing device and the gateway device; and
upon the second communication device requesting transmission of the captured video to the external communication device, the communication system is configured to terminate the communication session between the first computing device and the gateway device and establish a new communication session between the second computing device and the gateway device, such that the second computing device provides communication connectivity between the first computing device and the external communication device, through the gateway device, without terminating a connection between the gateway device and the external communication device.

13. The system of claim 7, wherein the first computing device is further configured to:
receive user input indicating that the contents of the second display area should be displayed to a user of the external communication device; and
based on the user input, transmit the contents of the second display area as video for reception by the external communication device.

14. The system of claim 13, wherein the second display area displays an application executing on the first computing device.

15. The system of claim 13, wherein the first display screen is a touchscreen, and wherein the user input comprises dragging the contents of the second display area to the first display area.

16. The system of claim 1, wherein the external communication session comprises a voice call, and wherein the first communication device is in voice over Internet Protocol ("VoIP") communication with a gateway device at the service provider network over the external session initiation protocol ("SIP") session.

17. The system of claim 16, wherein the external communication device comprises a plain old telephone system ("POTS") telephone, and wherein the gateway device at the service provider network comprises a VoIP-to-POTS gateway.

18. The system of claim 1, wherein the voice call comprises a video call.

19. The system of claim 1, wherein the second computing device leaves the voice call through a SIP bye message.

20. The system of claim 19, wherein the first computing device does not terminate the external communication session upon receipt of the SIP bye message from the second computing device.

21. The system of claim 1, wherein:
the internal SIP session is a first internal SIP session;
the communication system further comprises a third computing device configured to join the voice call through a second internal SIP session with the second computing device; and
the second computing device is configured to provide communication connectivity between the third computing device and the external communication device by bridging the first internal SIP session of the second device and the second internal SIP session of the third device.

22. An apparatus, comprising:
one or more non-transitory computer readable media having encoded thereon a set of instructions executable by one or more computing devices to perform one or more operations for facilitating enhanced communications, the set of instructions comprising:
instructions for establishing, for a user of a first computing device, an original voice call over an external session initiation protocol ("SIP") session between the first computing device, participating in the voice call, at a subscriber premises and an external communication device over a service provider network;
instructions for establishing an internal SIP session, over a local network, between a second computing device at the subscriber premises and the first communication device;
instructions for providing communication connectivity between the second computing device and the external communication device through the first computing device, by bridging the internal SIP session with the external SIP session, to enable the second computing device to join the original voice call between the first computing device and the external communication device, wherein when the second computing device joins the particular external voice call, the first computing device, the second computing device, and the external communication device are participating in the external original voice call;
instructions for the first computing device that provides communication connectivity between the second computing device and the external communication device to leave the voice call;
instructions for the second computing device to automatically establish a second external SIP session that is independent of and separate from the first external SIP session with the external communication device, such that the original voice call continues between the second computing device and the external communication device, without continued participation of the first computing device that provided communication connectivity between the second computing device and the external communication; and
instructions to terminate the first external SIP session between the first computing device and the external communication device once the second external SIP session has been established between the second computing device and the external communication device.

23. A method of facilitating enhanced communications, the method comprising:
establishing, for a user of a first computing device, an original voice call over an external session initiation protocol ("SIP") session between the first computing device, participating in the voice call, at a subscriber premises and an external communication device over a service provider network;
establishing an internal SIP session, over a local network, between a second computing device at the subscriber premises and the first communication device;
providing communication connectivity between the second computing device and the external communication device through the first computing device, by bridging the internal SIP session with the external SIP session at the first computing device, to enable the second computing device to join the voice call, wherein when the second computing device joins the particular external voice call, the first computing device, the second computing device, and the external communication device are participating in the external original voice call;
the first communication device that provides communication connectivity between the second computing device and the external communication device leaving the call;
automatically establishing a second external SIP session that is independent of and separate from the first external SIP session between the second computing device and the external communication device, such that the voice call continues between the second computing device and the external communication device, without continued participation of the first computing device that provided communication connectivity between the second computing device and the external communication; and
terminating the first external SIP session between the first computing device and the external communication device once the second external SIP session has been established between the second computing device and the external communication device.

* * * * *